(12) United States Patent
Gottsman et al.

(10) Patent No.: US 7,054,878 B2
(45) Date of Patent: May 30, 2006

(54) CONTEXT-BASED DISPLAY TECHNIQUE WITH HIERARCHICAL DISPLAY FORMAT

(75) Inventors: Edward J. Gottsman, Evanston, IL (US); Brandon Lee Walter Harvey, Chicago, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 0 days.

(21) Appl. No.: 10/960,580

(22) Filed: Oct. 6, 2004

(65) Prior Publication Data

US 2005/0060343 A1   Mar. 17, 2005

Related U.S. Application Data

(63) Continuation-in-part of application No. 10/361,988, filed on Feb. 11, 2003, which is a continuation-in-part of application No. 09/824,355, filed on Apr. 2, 2001.

(51) Int. Cl.
 *G06F 17/30* (2006.01)
(52) U.S. Cl. .................. 707/101; 345/629; 345/698
(58) Field of Classification Search .................. None
 See application file for complete search history.

(56) References Cited

U.S. PATENT DOCUMENTS

| | | | | |
|---|---|---|---|---|
| 5,544,354 A | * | 8/1996 | May et al. .................. 707/4 |
| 5,652,884 A | | 7/1997 | Palevich | |
| 5,742,271 A | * | 4/1998 | Imamura et al. .............. 345/23 |
| 5,896,114 A | * | 4/1999 | Imamura et al. .............. 345/55 |
| 5,963,940 A | | 10/1999 | Liddy et al. | |
| 6,026,388 A | | 2/2000 | Liddy et al. | |
| RE37,722 E | | 5/2002 | Burnard et al. | |
| 6,867,788 B1 | * | 3/2005 | Takeda .................. 345/630 |

FOREIGN PATENT DOCUMENTS

EP   1447758   8/2004

OTHER PUBLICATIONS

"Map of the Market"; from www.smartmoney.com; printed Dec. 8, 2000; p. 1.
2002-0143772 10/2002 Gottsman

* cited by examiner

*Primary Examiner*—Jean M. Corrielus
(74) *Attorney, Agent, or Firm*—Vedder Price Kaufman & Kammholz

(57) ABSTRACT

A system that includes a graphical user interface that may be used to access information contained in a database is provided. The graphical user interface includes a matrix of icons that correspond to elements in the database. Also hierarchical relationships are used for more compactly displaying multiple matrices associated with different subject categories. Moreover, by minimizing the size of the icons, a sufficient number of icons may be displayed in the matrix so as to establish an overall context of the elements in the database. Various techniques may be employed to highlight individual icons within the matrix while still preserving the overall context. In this manner, additional insight into the nature of the database may be gained. Further, the system can use translucence to allow detailed data to be superimposed on the matrix without impairing the viewing of the matrix's contents.

4 Claims, 17 Drawing Sheets

CONTEXT-BASED DISPLAY TECHNIQUE WITH HIERARCHICAL DISPLAY FORMAT

CROSS-REFERENCE TO RELATED APPLICATIONS

The instant application is a continuation-in-part of co-pending U.S. patent application Ser. No. 10/361,988, entitled Context-Based Display Technique, filed Feb. 11, 2003, having inventors Edward Gottsman and owned by instant assignee, the entire disclosure of which is hereby incorporated by reference which is a continuation-in-part of U.S. patent application Ser. No. 09/824,355, entitled Matrix-Based User Interface and System for Creating the Same, filed Apr. 2, 2001, the entire disclosure of which is hereby incorporated by this reference.

FIELD OF THE INVENTION

The present invention relates to the field of user interfaces and, in particular, the present invention relates to context-based user interfaces for permitting a user to view and rapidly search content in a database.

BACKGROUND OF THE INVENTION

Computer databases are increasingly being used to store information. Unfortunately, it can often be difficult for a user to quickly obtain information relating to the content stored in a database. Typical database user interfaces require a user to enter a search string and, after a search of the database has been performed, a list of elements that contain the search string is displayed to the user. The search process can be time-consuming and a user may be forced to perform several searches before obtaining a small enough list of elements that can be read by the user. Furthermore, with typical database user interfaces, the user has no way of knowing how the particular elements are distributed within the database. Stated another way, list-based result presentations do not provide the user with context of the elements within the database, i.e., the interrelated conditions in which the elements in the database exist. For example, the user may not know that there is a relatively large number of elements listed under one subject and a relatively small number of elements listed under another related subject. Without this information, the user is unable to optimize the search process.

In addition, where a large number of elements such as documents are stored in one or more databases, it can be difficult to visually represent the entire database or large portions of the database to provide a user with a more optimal searching environment. User interfaces are known for providing search results and allowing a user to entire search terms. A search engine then searches for the key terms within one or more databases. Hierarchical links between categories and subcategories and the database elements, such as papers, are provided. However, the results are typically provided in a text format which includes for example a list of categories in which documents may be found or a list of found documents themselves may appear. However, only twenty or so documents typically appear on a single screen. The user must then typically navigate through multiple screens to access the documents which provided the hits to the keyword search. In addition, such systems numerically show the relevance or popularity of the particular document that was found to contain the keywords.

Therefore, there exists a need in the art for a database user interface that conveys information relating to the content of the database, including the context of the elements within the database, to the user and that allows the user to rapidly and efficiently retrieve relevant information from the database.

SUMMARY OF THE INVENTION

One aspect of the present invention provides a graphical user interface for rapidly viewing and searching a database or other collection of digital assets. The graphical user interface is implemented through a computer system, including a display and a user selection device. Information about the database is displayed in a matrix form presented to the user in at least one matrix area on the display. The matrix preferably includes a number of cells. The matrix also includes row headings and column headings, the row headings preferably indicating one attribute of the elements and the column headings preferably indicating another attribute of the elements. Within each cell is displayed one or more icons, such as a small square, dot or other symbol, corresponding to an element of information in the database. The database elements may be text excerpts, graphic files or other media. The icons displayed within the matrix cells may have visually perceptible attributes to indicate, for example, whether or not a user has already viewed a particular excerpt in the database. The number of icons within each cell visually indicates to the user the number of database elements that correspond to a particular combination of element attributes. Because a large number of cells and constituent icons may be presented in this manner, a user of the display is provided with an overall context of the elements in the database, which context is helpful in aiding the user's understanding of the contents of the database. As a user activates the user selection device to move a graphic pointer over a particular icon, data or information associated with an element corresponding to the icon is quickly shown on the display. For example, the associated data or information may comprise text or other information intrinsic to the element as well as text or other information from elements related to the selected element. In one embodiment, the user interface also preferably includes a search function, which permits the user to enter a search string and, in response, the icons corresponding to database elements containing the search string are modified in a visually perceptible manner to indicate to the user which database elements are responsive to the user's search.

In one embodiment of the present invention, there is provided a novel system for compiling an executable file that provides a user interface for rapidly viewing and searching a database. A content translator preferably retrieves content from various sources, which may communicate with the translator over a local or wide area network, such as the Internet. The sources may include a news feed and a general database. The content translator generates an element database, which preferably contains elements that all have a common format. A content editor may also be provided to permit a user to edit or create content to be added to the element database. A compilation translator processes the element database to create an element library. In accordance with the invention, a compiler/linker compiles the element library and source code to create an executable file which, when executed, provides a user interface for rapidly viewing and searching a database. Because the element library is compiled with the source code, retrieval and searching of desired elements in the database may occur much more rapidly than would otherwise be attainable with prior-art compilation systems and methods.

In another embodiment of the present invention, the user interface preferably includes a heads-up display (HUD) feature that is used to display an element on top of the matrix without obscuring the matrix itself. The user may vary the HUD's opacity from perfectly opaque through translucent to perfectly transparent. The HUD allows the user to see both an element's information and the context in which that element occurs. Additionally, the user interface may include a rectangular "fish eye" magnification function that allows the user to smoothly magnify one part of the matrix while shrinking—yet not obscuring—other parts of the matrix. Magnification allows the user to focus on one part of the matrix while retaining the context in which it appears. Other techniques in addition to variations in opacity or magnification may be used to adjust the perceived dimensions of certain portions of the matrix.

In yet another embodiment, the user interface preferably includes two search functions. First, the user may select one or more aspects of information from elements related to the current element, thereby highlighting all of the elements that share that aspect. For example, an element that represents a motion picture might include a plot summary (which is intrinsic to the element) and a list of cast members (which is not). The cast members serve to relate motion pictures to one another. This particular search might take the form of selecting a cast member, which would highlight on the display all of the motion pictures in which that cast member has appeared. Selecting one of the motion pictures might in turn highlight all of the actors who appeared in it. Because it supports following the network of connections that relate elements to one another, this type of search is called "navigation." The second type of search entails locating an element or elements without necessarily knowing any of its connecting elements. This type of search uses the intrinsic properties of an element—in the present embodiment, an actor or a movie—to locate that element. For example, a search for "Kevin Bacon" might discover the element representing the actor "Kevin Bacon." A search for the words "bugs bunny" might locate all of the movies in which "bugs bunny" appears in the title or summary. Because it exploits the intrinsic properties of an element—the indices or keywords—this type of search is called a "keyword search." Because the overall context of the database is visible regardless of the operations performed by users, the present invention allows users to gain greater understanding of the contents of a database.

In another embodiment, a method and apparatus for displaying elements in a database includes displaying a plurality of same level subject category identifiers, such as text, icons or other representations of a plurality of category titles that are all at a same hierarchical level of a tree based hierarchy. The plurality of same level subject category identifiers are displayed on a display area of a display screen in response to a search operation. In response to a selection of one of the subject category identifiers on the display, the method and apparatus displays on the same display area, within a matrix area on the display, a hierarchically linked matrix that is linked to the selected subject category identifier. The hierarchically linked matrix includes the plurality of cells and at least one icon displayed in each of the plurality of cells. As noted above, the icons correspond to elements in a database and do not include textual identifying indicia. In the event a search was conducted based on, for example, a keyword search or other type of search query, the icons for example may be colored or highlighted for those that satisfy the search requirements. Preferably, the matrix shows by way of the icons and cells, all database elements associated with the corresponding subject category to which the matrix is linked. When another subject category identifier is selected, the method and apparatus includes displaying on the same display area in another matrix area on the display another hierarchically linked matrix that is linked to the new selected subject category. As such, multiple matrices are simultaneously displayed. Each of the matrices includes the plurality of cells and icons that identify or correspond to each element in the database corresponding to the respective cell categories. As described above with respect to FIGS. 1–13, since there are multiple cells linked to different subject category identifiers, all elements in the database associated with a given subject category identifier are displayed when a category identifier is activated.

A check is made to see if of all the information from the multiple matrices will fit in the desired viewing area. If they will not fit in their entirety, the method includes visually changing, such as by shrinking one of the matrices such that the shrunk matrix visually represents cells and corresponding icons in a modified graphic form. In this example, the modified matrix shows less detail but still shows the cells. For example, since a user may wish to be notified that multiple hits from multiple subject categories have been found, a small bar graph format or any other suitable format may be used to effectively shrink the information from one matrix to a size which allows the other matrix to be displayed in its entirety including all of the icons and corresponding cells. When a user then desires to see the details of the shrunk matrix, the user may click on a portion of the shrunk matrix, or use any other suitable selection mechanism, and then that matrix is enlarged and the other matrix is then shrunk. Accordingly, the representation of large volumes of documents and hence database elements may be graphically depicted in a single screen. The hierarchical link allows one matrix to be shrunk for example while allowing another matrix can be enlarged, but relevant information from both matrices is displayed.

In another embodiment, navigation to a pertinent data element is provided by superimposing an overlay that includes a list of database elements, such as document titles for example, that are associated with a selected subject category identifier. The list is superimposed over at least a portion of a matrix in such a manner as to avoid obscuring the underlying matrix data. In response to a user selecting an item on the list, a visual connector (e.g. pointer), such as a graphic that looks like a search light or any other suitable visual connector, is generated as appearing to emanate from the list to a corresponding icon locating element, such as a bulls eye, or any other suitable graphic, that visually identifies the icon in the matrix that corresponds to the selected entry on the list. As such, a user may scroll down the list, and the method and apparatus automatically highlights the appropriate icon in the appropriate cell of the appropriate matrix so that the user can click on the icon, and pull up the document or get other related information as desired. As such, navigation is provided to a particular icon in a hierarchical matrix from a list of database elements which may be in any suitable order such as alphabetical or otherwise.

In another embodiment, icons in a matrix are visually coded to indicate a level of recency of the database element corresponding to the icon. For example, if an icon is a colored rectangle, a triangle may be overlayed on the icon to indicate that that particular database element was recently added to the database.

In another embodiment, a color gradient arrangement for multiple icons is used to visually illustrate the measure of popularity, such as a popularity within a given subcategory, associated with each data element identified by each of the plurality of icons. As such, a user can visually determine, without needing to see numerical representations, the popularity or importance of a particular reference or series of references from a search and are visually presented with, for example, sorted icons that are sorted to visually display gradient color scheme indicating, for example, that the icons with the brightest color are the most popular and the subsequent icons in the color gradient represent elements that are less popular.

BRIEF DESCRIPTION OF THE DRAWINGS

The present invention is illustrated by way of example and not limited in the accompanying Figures in which like reference numerals indicate similar elements and in which.

DETAILED DESCRIPTION OF PREFERRED EMBODIMENTS

Figure 1:
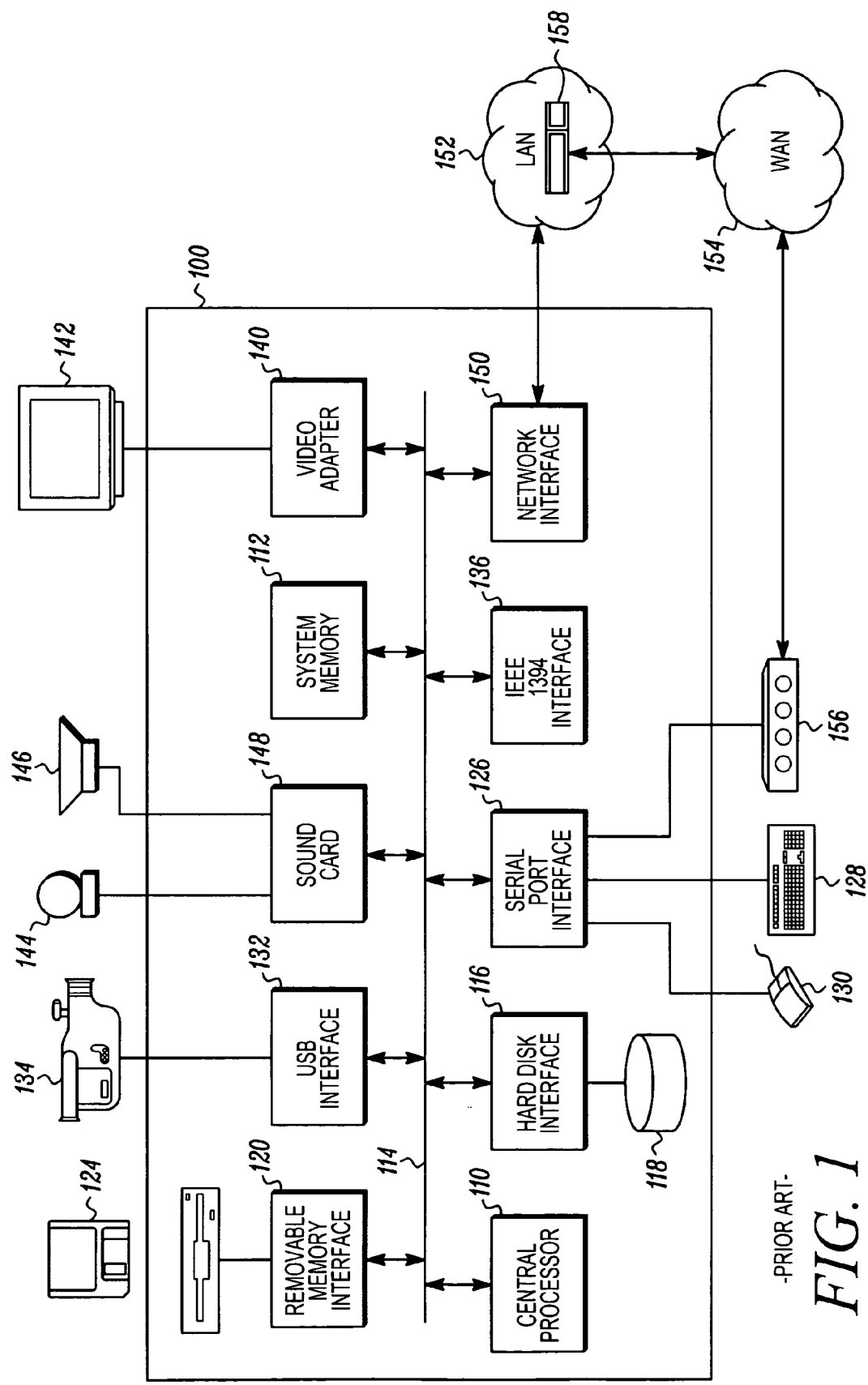
FIG. 1 shows a typical prior art workstation and communication connections.

The present invention may be embodied on a computer system, such as the system 100 shown in FIG. 1. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may be configured to operate with particular manufacturer interfaces such as FireWire developed by Apple Computer and i.Link developed by Sony. Input devices may also be coupled to system bus 114 through a parallel port, a game port, a PCI board or any other interface used to couple an input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The present invention may also be practiced with other computer system configurations, including hand-held devices, multiprocessor systems, microprocessor-based or programmable consumer electronics, network PCs, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

The discussion below relative to FIGS. 2–7 relate to a first embodiment of the present invention characterized at least in part by executable code implementing the graphical user interface that is integral with the data that is being presented to a user of the graphical user interface. The discussion below relative to FIGS. 8–13 relate to a second embodiment of the present characterized at least in part by executable code implementing the graphical user interface that is separate and apart from the data that is being presented to a user of the graphical user interface. Both embodiments, however, share the characteristic that the graphical user interface displays information in such a manner that context of the overall data is maintained despite any other user-initiated operations that may be performed. As used herein, the term "context" means the interrelated conditions in which something exists or may occur. Thus, for example, where the contents of a database are displayed, the context of the constituent elements of the database is represented to the extent that at least some of the interrelated conditions in which the elements occur within the database are represented.

Figure 2:
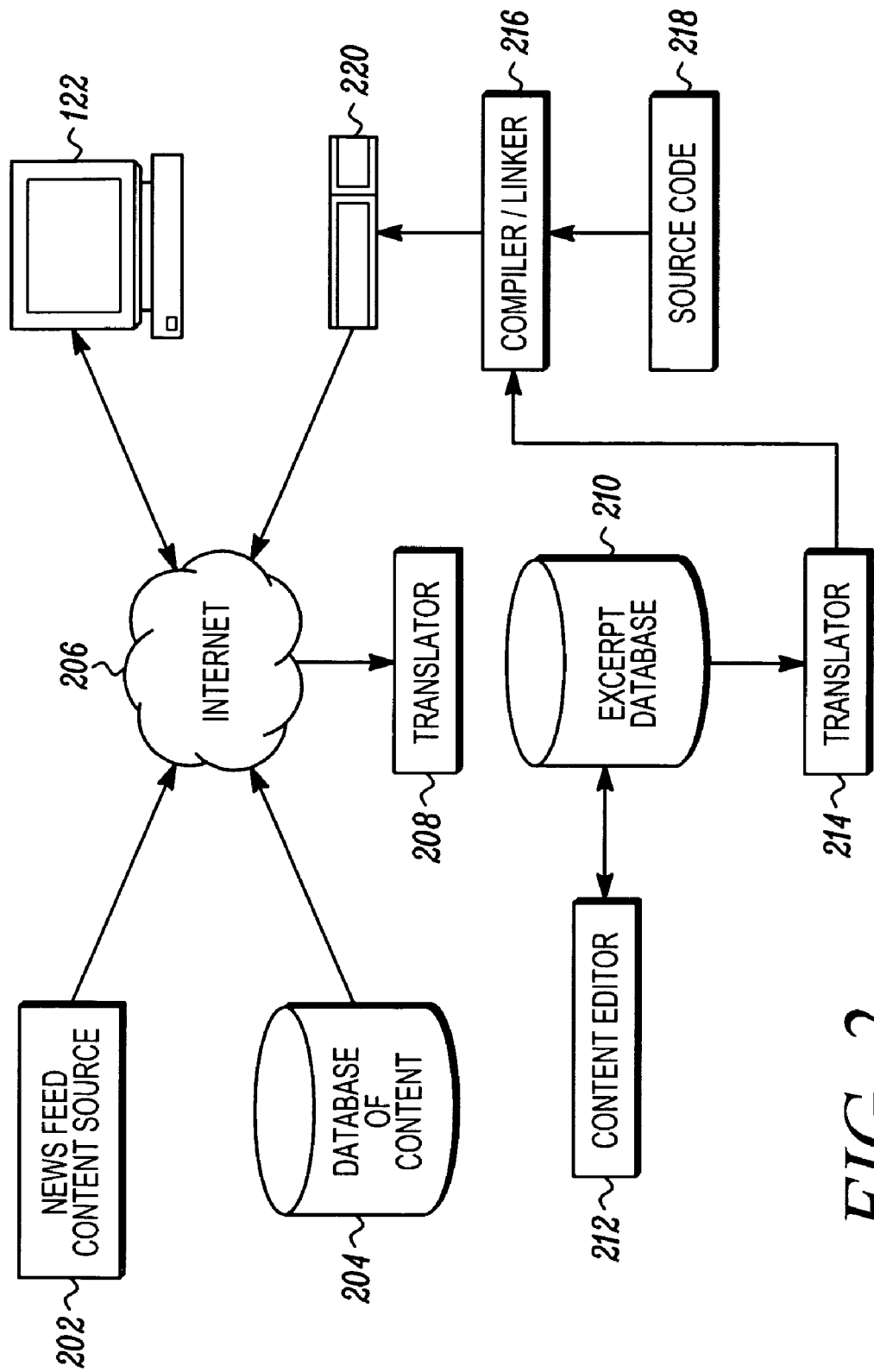
FIG. 2 shows a system that can be used to create and distribute matrix database executable files in accordance with one embodiment of the invention.

Referring now to the first embodiment, a system that can be used to generate an executable file in accordance with the present invention will first be described and then a resulting graphical user interface will be described. FIG. 2 shows a system that can be used to create and distribute matrix database executable files in accordance with the first embodiment of the invention. For the purposes of illustration only, the first embodiment of the present invention is described in terms of a news presentation service. However, it is understood that other types of information could be equally used in the first embodiment describe herein. Referring again to FIG. 2, a news feed 202 and a database of content 204 can be transmitted through a wide area network (WAN) 206, such as the Internet, to a translator 208. A single news feed 202 and a single database of content 204 are shown for illustration purposes only. The present invention may be used with a variety of different news feeds, databases, web sites or other sources of content. The content transmitted by news feed 202 and database 204 may be in a variety of different formats and may include a variety of different computer coding. For example, news feed 202 may transmit a story that is marked up with a markup language such as HTML, while database 204 may transmit a story in WordPerfect format.

Translator 208 receives the content transmitted from news feed 202 and database 204 and produces excerpts that may be stored in an excerpt database 210. Translator 208 operates in a conventional manner that is well-known to those skilled in the art. In particular, translator 208 may perform functions such as stripping computer code, truncating articles, identifying fields such as title and author and removing double carriage returns. While FIG. 2 shows a single translator 208, a separate translator may be included for each source of content. Of course, some sources of content may use the same translator.

A content editor 212 may also be used to edit content in database 210. In one embodiment of the invention, content editor 212 may be implemented with a database editor such as Microsoft Access. For example, content editor 212 can be used to enter information that is particularly relevant to employees of enterprise, such as confidential enterprise information.

In one embodiment, all of the excerpts included in database 210 have a common format. Fields such as the title, date, source and author of each excerpt may be identified. The fields may be identified by listing them in a predetermined order, including the fields between appropriate tags of a markup language or any other manner that identifies each field. Furthermore, each excerpt may be formatted to not exceed a predetermined length.

A compilation translator 214 retrieves excerpts from excerpt database 210 and creates a large file or files containing a large number of excerpts. In the first embodiment of the invention, compilation translator 214 creates a C++ library file that essentially contains a data structure of a large number of excerpts. The use of the resulting library file will be described in detail below.

Next, a compiler/linker 216 receives a library file created by translator 214 and source code 218. Compiler/linker 216 may be installed on a computer (not shown) and the computer may be programmed to retrieve the library file in response to a command from a user or without a command from the user. Source code 218 may be a C++ program that contains computer executable instructions for creating a matrix database. Source code 218 may be configured to operate with a variety of different library files so that the configuration of source code 218 is independent of the library file created by translator 214. Compiler/linker 216 may create an executable file in a conventional well-known manner.

The executable file may be transmitted to a router 220 and then to wide area network 206. Finally, the executable file may be transmitted from wide area network 206 to a computer terminal 222. Of course, the executable file does not have to be transmitted through wide area network 206. In an alternative embodiment, computer terminal 222 may be connected to compiler/linker 216 by a local area network (LAN). The output of compiler/linker 216 may also be stored on a computer readable medium, such as a floppy disk, that may be used to transfer computer executable instructions to computer terminal 222.

There are several advantages that are obtained by distributing the matrix database in a single executable file as opposed to an executable file linked to one or more libraries. A single executable file allows for faster searching by a user. There is no need for the executable file to read a linked library and index the library before performing a search.

The matrix database stored on computer terminal 222 may be updated periodically. There are number of different methods that may be used to update the matrix database. In one embodiment of the invention, computer terminal 222 is programmed to periodically obtain new matrix databases from WAN 206. The determination as to when to update the matrix database may be based on factors such as the time since the last update and the amount of content that has been accessed by a user. In an alternative embodiment, the user may be provided with an option of manually requesting an updated matrix database from WAN 206.

Figure 3:
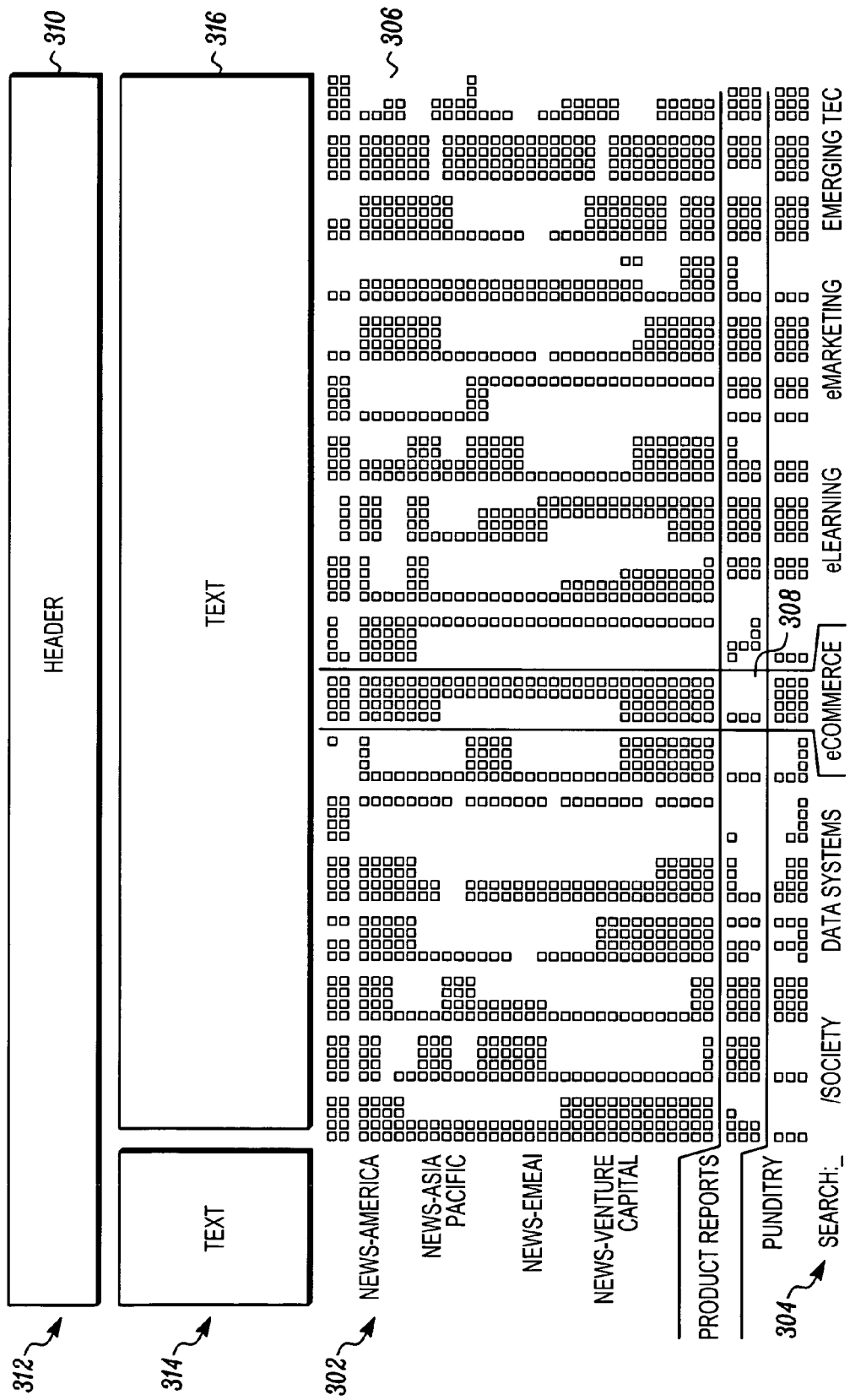
FIG. 3 shows a graphical user interface that can be used to retrieve and access information stored in a database.

FIG. 3 shows a graphical user interface that can be used to select content in accordance with one embodiment of the invention. A list of content sources are shown in column 302 and a list of topics are shown in row 304. Of course other indices such as publish date and author could be mapped to the axes. A user may use arrow keys or a pointing device, such as a mouse, to position a cursor over one of the squares shown in grid 306. Each square shown in grid 306 represents different pieces of content, such as an excerpt of an article.

As noted above, one of the advantages of the present invention is that it allows the user to see a representation of all of the data included in the database and the distribution of data in that database, i.e., the context of the element of the database.

For example, block 308 includes four entries, which informs the user that there are four articles relating to the topic eCommerce from the source Product Reports. The color of each of the entries included within a block may also convey information to the user. For example, one color or shade may represent an article that has not been read by a user and another color or shade may represent articles that have been read by the user.

As described above with reference to FIG. 2, translator 208 identifies predetermined fields for each article, such as the title, author and date of publication. The interface shown in FIG. 3 places the identified fields in predetermined locations. For example, the source of the article may be positioned in a source location 310, the date of publication may be located in a date location 312 and the title may be positioned in the title location 314. The actual excerpt may be displayed in an excerpt section 316. In one embodiment of the invention, the user may press a key or select a button with a pointing device to expand the excerpt over the section where grid 306 is shown. One skilled in the art will appreciate that there are a number of different methods that may be used to create the interface shown in FIG. 3.

Figure 4:
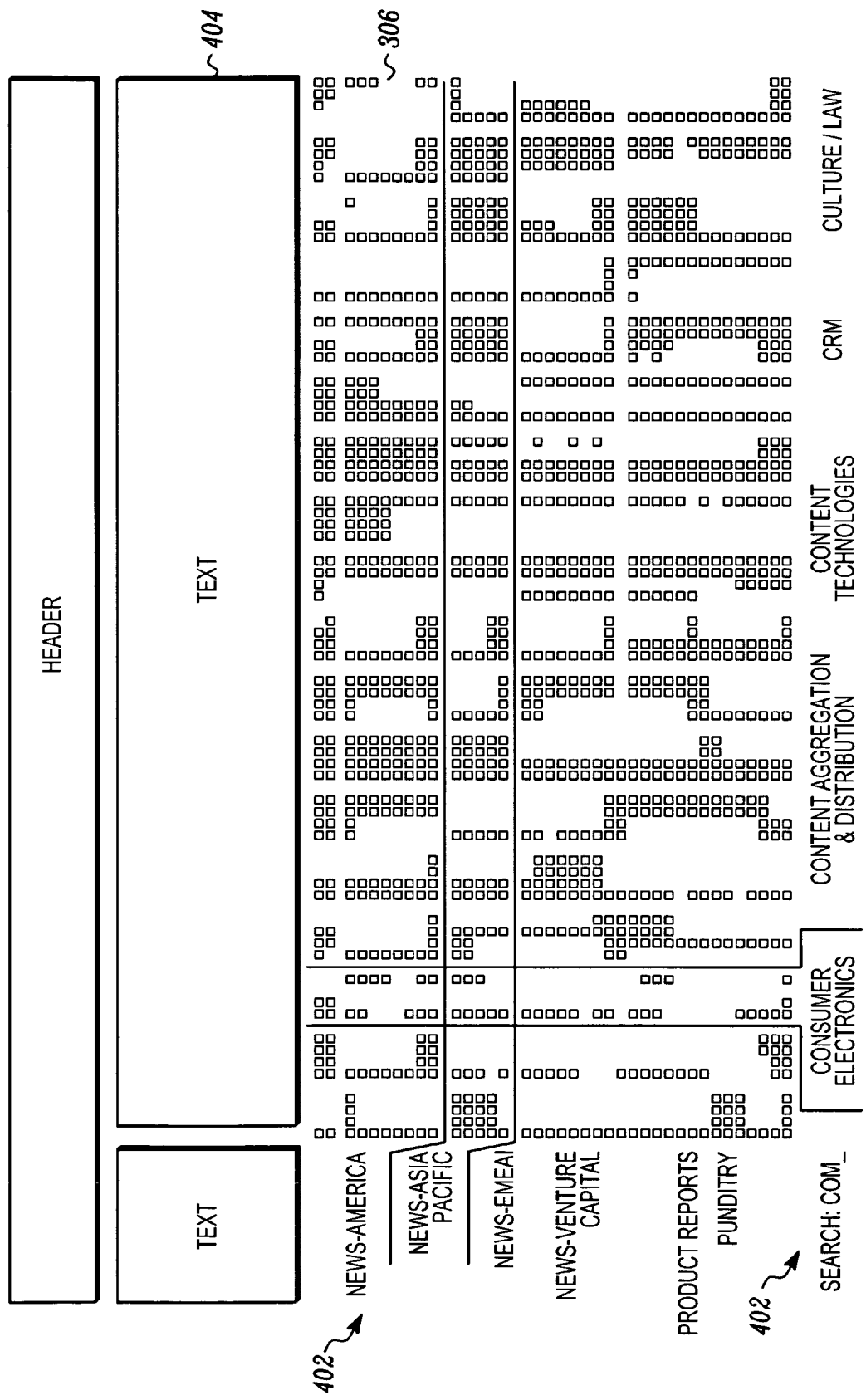
FIG. 4 shows the state of a graphical user interface during a search operation.

FIG. 4 illustrates how the present invention can be used to search a database. In particular, the user can enter a search string in a search entry section 402. As the user enters letters, the entries in grid 306 may change color to indicate whether or not the corresponding excerpt contains such a string. In the example shown in FIG. 4, the light colored boxes correspond to articles that contain words with the letters "ele." Furthermore, the sections of excerpt 404 that contain the letters "ele" may be highlighted.

As shown in FIG. 4, the user is able to retrieve an instant indication of the number of articles that contain the search string. One of the advantages of this type of interface is that it allows the user to instantly determine whether or not additional letters should be entered to narrow the search.

Figure 5:
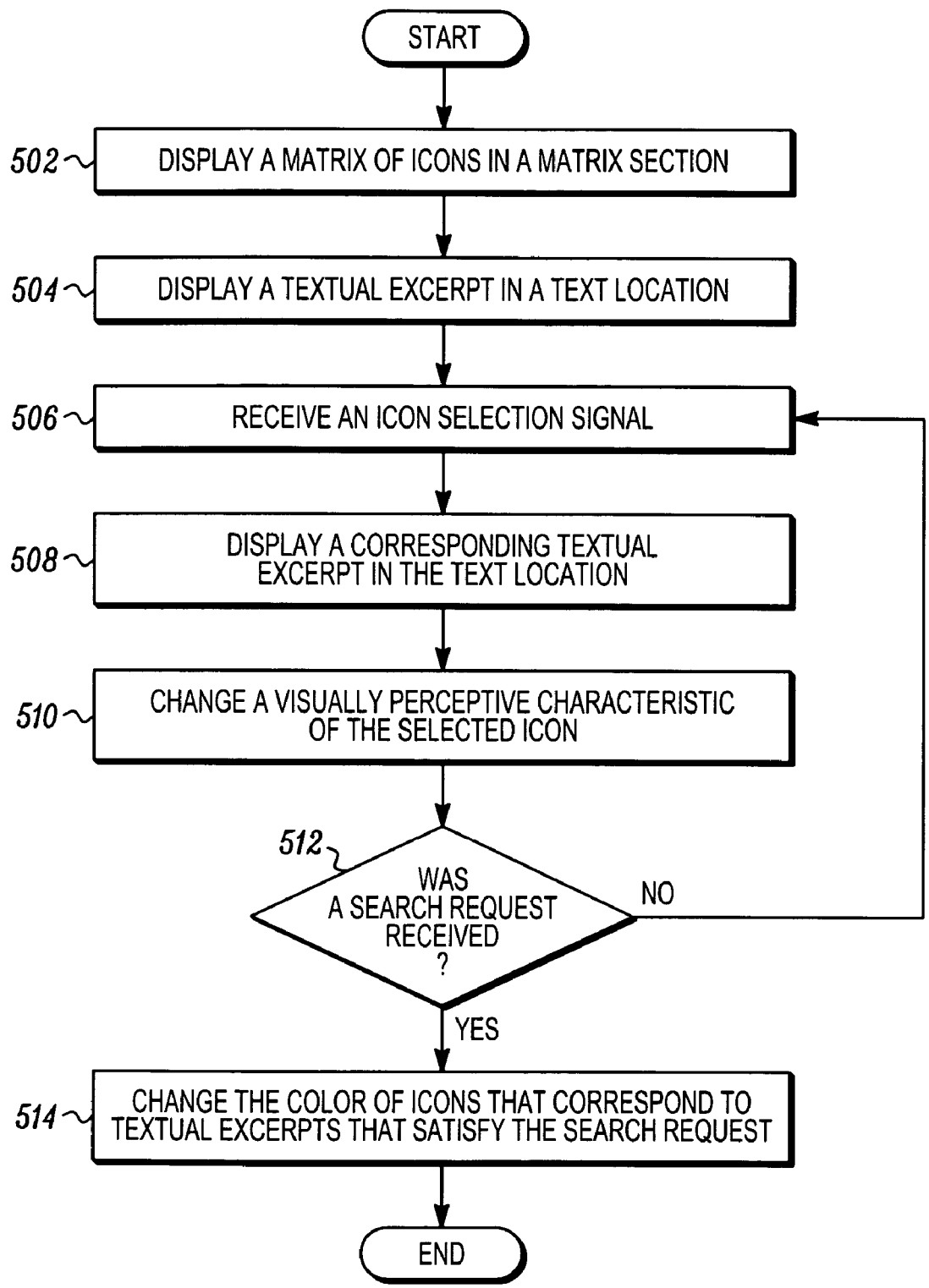
FIG. 5 shows a method that may be used to generate graphical user interfaces in accordance with an embodiment of the invention.

FIG. 5 illustrates a method that may be used to generate the graphical user interfaces shown in FIGS. 3 and 4 and to respond to commands from a user. First in step 502, a matrix of icons are displayed in a matrix location. Persons of skill in the art will understand that many different methods can be used to generate and display the matrix. Exemplary methods are discussed below and shown in FIGS. 6 and 7. After the matrix of icons is displayed in the matrix location in step 502, a textual excerpt is displayed in a text location in step 504. FIG. 3 shows matrix location 306 and text location 316. In step 506, an icon selection signal may be received. The icon selection signal may be generated in response to a user positioning a cursor over an icon. After receiving an icon selection signal, a corresponding textual excerpt is displayed in the text location in step 508. In step 510, the color or another visually perceptive characteristic of selected icons may be changed after an icon is selected to present the user with an indication of which icons have been selected.

A search may be initiated in step 512. As described above, the search may involve entering character strings. One skilled in the art will appreciate that the disclosed graphical user interface may be configured to perform other searches, such as searches relating to dates of publication, sources and subject matter. In step 514, the color or another visually perceptive characteristic of icons corresponding to textual excerpts that satisfy the search request is changed.

Figure 6:
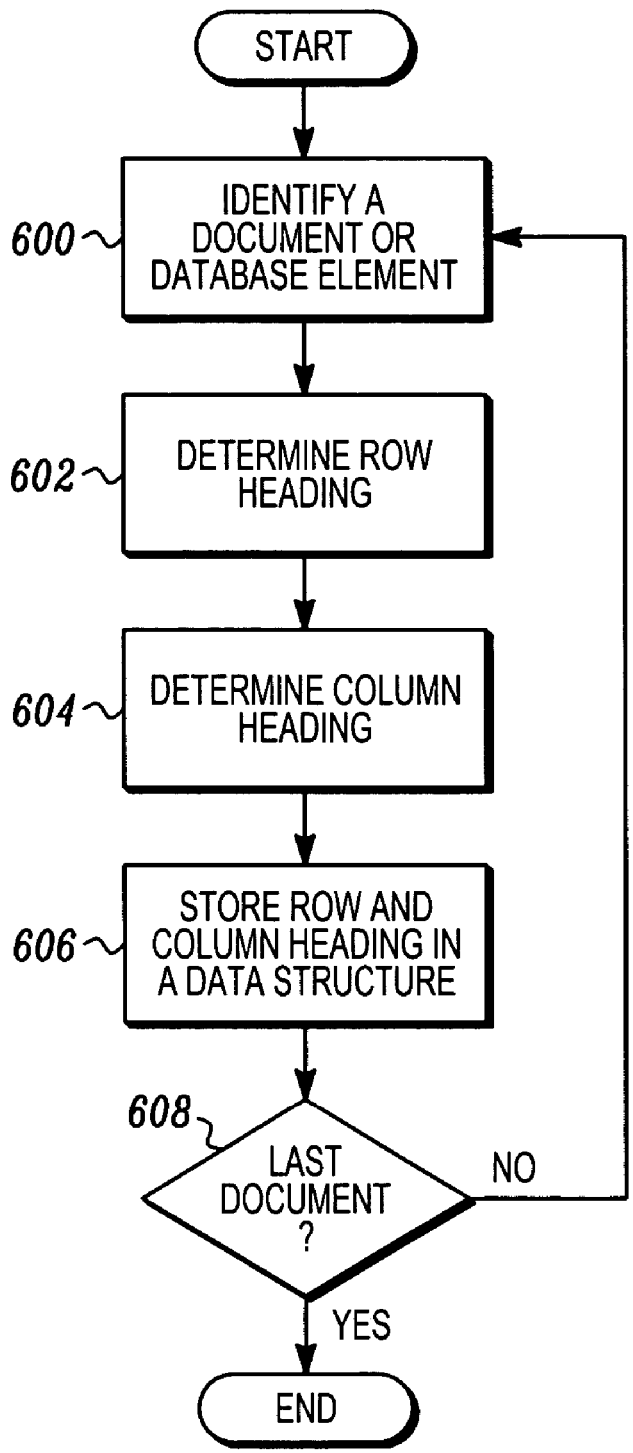
FIG. 6 illustrates an exemplary method of generating the data for the graphical user interface in one embodiment of the invention.

As previously mentioned, skilled artisans will understand that many different methods can be used to generate and display the matrix. FIG. 6 illustrates an exemplary method of generating the data for the matrix. This method can be automated if, for example, the documents or other database elements are indexed. Suitable indexes include, but are not limited, to field tags or field deliminators/symbols. Otherwise, the method can be manually implemented. Irrespective of whether the method is automated or manually implemented, an artisan can use the same steps. First, a document is identified in step 600. Depending on the content of the document or one or more fields in the document, a determination is made in step 602 as to the appropriate row heading for the document. This row heading could, for example, correspond to the source of the document. Next, the content of the document or one or more fields in the document can be used to determine in step 604 the appropriate column heading for the document. The column heading could, for example, identify subject matter to which the document relates. The row and column headings could then be stored in step 606 in a data structure corresponding to the document or database element. This process could be repeated until all documents or database elements are categorized (i.e. row and column headings are assigned and stored for each document or database element) as illustrated in step 608.

Any data structure, database system, array, or pointer-based system could be used to store the row and column-heading categorizations for the documents or database elements. A sample data structure could be the C++ data structure shown below.

```
typedef struct mystructtag {
        int x; // column number
        int y; // row number
} nugget_struct;
```

In this structure, "x" is an integer value, which can correspond to column-heading assignment. Similarly, "y" is an integer value, which can identify a row-heading assignment. Of course, this data structure could include other variables associated with the documents. In this example, a separate data structure would correspond to each document or data element. An example is shown below. In this example, the data structures of all of the documents in the system are stored in an array. However, the data structures could be stored in any manner desired. In this example, there are fifteen documents in the system, and therefore fifteen data structures stored in the array of data (i.e. one data structure for each document). The first value in each data structure corresponds to the variable "x" (i.e. the column heading) and the second value corresponds to the variable "y" (i.e. the row heading). These axis values (i.e. row and column assignments) are preferably listed sequentially in the source code as shown below.

```
nugget_struct MatrixGridData[ ] = {
    0, 0, /* Directing Integration: Directories for the Masses */
    0, 0, /* Embedded EAI Process Automation Tools */
    0, 0, /* Skill Supply Drives Component Demand */
    0, 0, /* Help! How do I use the Accenture Information Source? */
    0, 0, /* The State of XML */
    0, 1, /* Fasten Your Seat Belt */
        0, 1,   /* There Goes The Sun */
        0, 2,   /* Bit-Serial Neuroprocessor Architecture */
    1, 0, /* B2B Sell Side: Lessons Learned from B2C */
    2, 1, /* Driving Online Car Sales */
    2, 1, /* Banking and Trading Online */
        3, 0,   /* Wireless Internet Devices: From Phones to the Future */
        3, 0,   /* PC and Handheld Markets--Projections for 2001 */
    5, 0, /* Managing Digital Assets */
    7, 5, /* Accenture and election.com Announce Alliance to Market Services and Solutions to Modernize Election Systems */
};
```

The label for each row and the label for each column can also be preferably stored in an array or other suitable structure. An exemplary C++ character array of possible column labels is shown below.

```
char *ColumnLabels[ ] = {
    "Arch & Sys Dev",
    "B2B",
    "B2C",
    "Consumer Electronics",
    "Content A&D",
    "Content Tech",
    "CRM",
    "Culture, Law, Society",
    "Data Systems",
    "eCommerce",
    "eLearning",
    "eMarketing",
    "Emerging Tech",
    "Enterprise Apps",
    "eServices",
    "Gaming",
    "Hardware",
```

-continued

```
    "Information Insights",
    "IT Operations",
    "KM & Collaboration",
    "Mobile Computing",
    "Networking",
    "New Media",
    "Operating Systems",
    "Security",
    "Sensors & Biometrics",
    "Storage",
    "Strategy",
    "Supply Chain",
    "Telecoms & ISPs",
    "Ubiquitous Comp",
};
```

A sample C++ character array of possible column labels is shown below.

```
char *RowLabels[ ] = {
    "Analyst Reports",
    "By the Numbers",
    "News--Americas",
    "News--Asia Pacific",
    "News--EMEAI",
    "Splash",
};
```

Thus, for example, the document entitled "Directing Integration: Directories for the Masses" was assigned column 0 and row 0, and is therefore in the "Arch & Sys Dev" column and in the "Analyst Reports" row. Similarly, "Driving Online Car Sales" contains 2, 1 in its data structure and therefore would be in the "B2C" column and the "By the Numbers" row.

Figure 7:
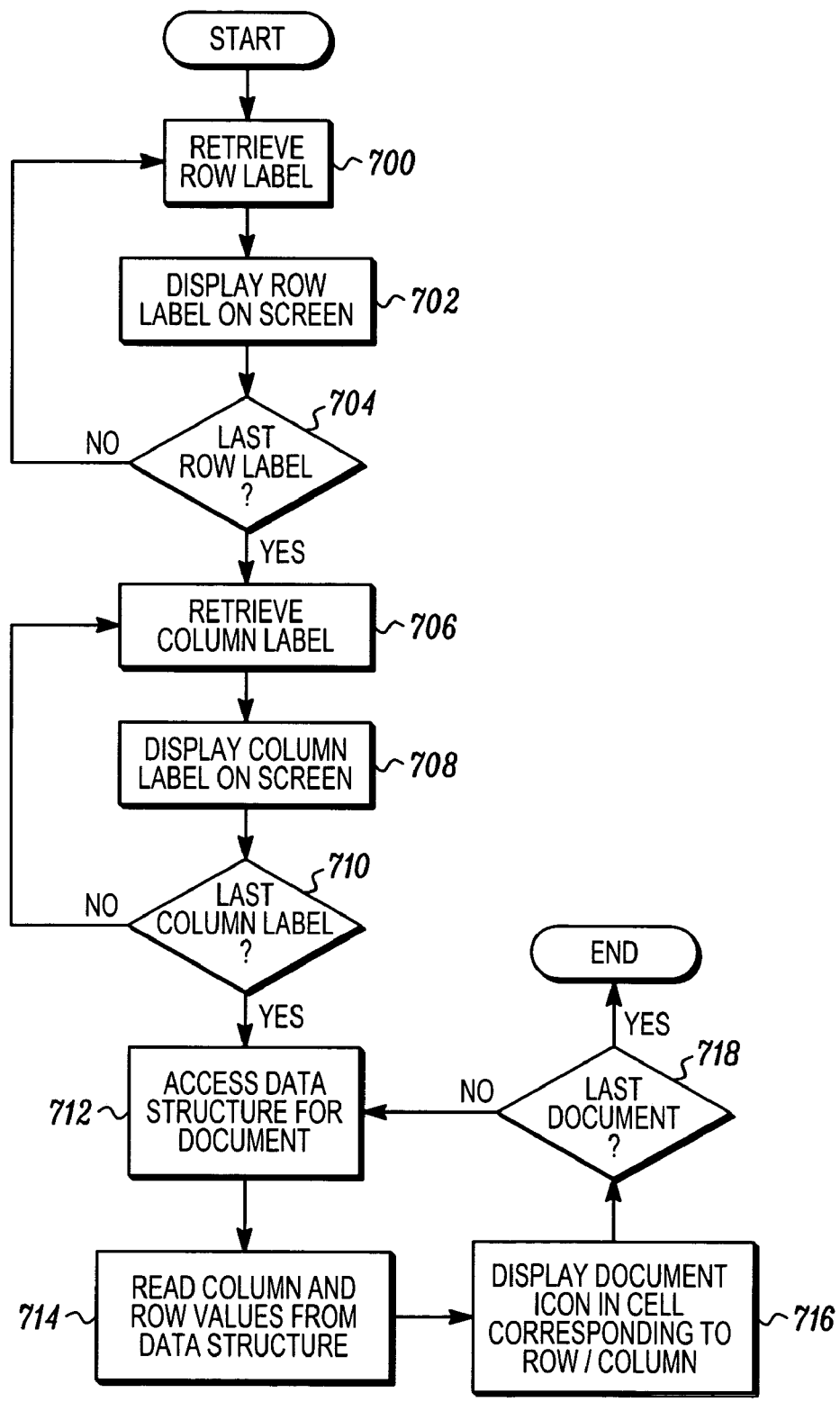
FIG. 7 illustrates a sample method of displaying the data for the graphical user interface in accordance with an embodiment of the invention.

After the data for the matrix is generated, the matrix can then be displayed. FIG. 7 illustrates an exemplary method of displaying the matrix. Again, skilled artisans will readily appreciate that any method could be used to display the matrix. For example, the array of row labels or headings for the matrix could be displayed on the screen. This could occur in step 700 by retrieving the first row label (i.e. RowLabels[0]) from the array storing the row labels. The row label could then be displayed in step 702. As shown in step 704, the process could repeat until either all row labels are displayed or insufficient room remains on the screen to display all row labels. Next, the first column label (i.e. ColumnLabels[0]) could be retrieved in step 706. The column label would be displayed in step 708 and the process could repeat until all column labels are displayed or insufficient room remains on the screen to display all column labels 710.

Alternatively, the row and column labels might only be displayed when a mouse or user-selection device is located over a corresponding document. For example, when a user positions a cursor over the icon for the "Directing Integration: Directories for the Masses," the "Arch & Sys Dev" column label and/or in the "Analyst Reports" row label might only be displayed. Or, the row labels might always be displayed, and only column label would be displayed that corresponds to the document icon over which the cursor is currently position. Any variation of these is contemplated and within the scope of the invention.

Next, the data structure corresponding to the first document available to be displayed could be accessed in step 712. The column and row values (i.e. the "y" and "x" values) for that document could be read from the data structure in step 714. A dot, square or other symbol could then be displayed in the cell corresponding to the specific column and row combination in step 716. For example, a dot could be placed in the cell for the "Arch & Sys Dev" column and the "Analyst Reports" row for the document entitled "Directing Integration: Directories for the Masses." As shown in step 718, this process could be repeated until dots for all documents are displayed on the screen—depending, of course, on the available area on the screen to display the quantity of documents, row labels and column labels.

As discussed above, there are a number of different ways to implement the graphical user interface in accordance with the first embodiment of the present invention. For example, the graphical user interface may be implemented as a stand-alone software program for accessing information stored in a database, as a screen saver or as part of another software program. When used as a screen saver, the interface may be programmed to randomly select excerpts included in the database to display in section 316. Another advantage of using the interface as a screen saver is that it allows the user to rapidly obtain information that may be needed during a meeting. The content included in the database may be the type of content that may be relevant to the particular meeting and the user may rapidly obtain information on a subject or perform searches to obtain information without going through a burdensome search process. An example of using the disclosed graphical user interface with another software program includes using the interface to allow the user to access help topics included within a help menu of the software program.

The speed with which a user can search and retrieve excerpts is a function of many factors. One way to optimize the speed of the graphical user interface is to bypass most of the elaborate native user interface facilities provided by most operating systems. Interface facilities such as scroll bars, windows and menus consume processor capabilities and can slow down the performance of the graphical user interface.

The present invention may be used with a variety of different files in a variety of different formats. In addition to text files, files such as digital image files and executable files may be accessed by the disclosed matrix graphical user interface. Furthermore, a single matrix graphical user interface may provide access to several different file types.

Building upon the first embodiment, the second embodiment of the present invention illustrates an example in which the data to be accessed and displayed via the graphical user interface is not integral to executable code used to implement the graphical user interface. The example of the second embodiment of the present invention illustrated in FIGS. 8–13 is described in terms of a database regarding movies and the manner in which such information is presented via the graphical user interface. However, it is understood that databases comprising other types of information could be equally used in the second embodiment describe herein.

Figure 8:
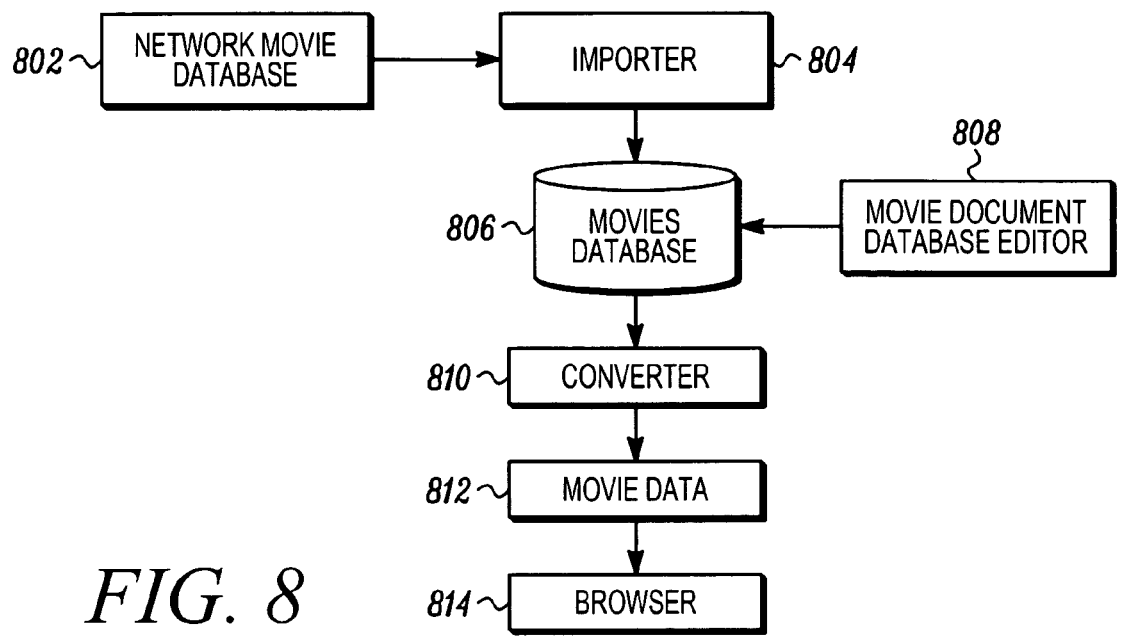
FIG. 8 is a block diagram of a system in accordance with a particular embodiment of the present invention.

FIG. 8 illustrates a system in accordance with the second embodiment of the present invention. A network movie database 802 is provided via a communication network (not shown) which may comprise a public network such as the Internet or World Wide Web. It is understood that a different type of communication network, such as a private network like an intranet, could be equally employed where the database (regardless of its content) resides within a private network. Further still, a combination of public and private network elements may be employed as necessary. Regardless, an example of the network movie database 802 is the so-called Internet Movie Database (IMDB; available at http://www.imdb.com). Preferably, the network movie database 802 (or any other type database to be used) comprises a content-rich source of information regardless of the particular structure or format of the database. A single network movie database 802 is shown for illustration purposes only. The present invention may be used with a variety of different databases, web sites or other sources of content. The content available from the database 802 may be in a variety of different formats and organizational hierarchies, and may include a variety of different computer coding.

An importer 804 is used to extract the desired information from the network movie database 802 for storage in a movies database 806. The movies database 806 differs from the network movie database 802 to the extent that the content stored in the movies database 806 is particularly structured to be operated upon by the movie document database editor 808 and the converter 810. The importer 804 may comprise one or more modules that connect to the remote network movie database 802 either periodically or on demand to retrieve movie data and update the contents of movies database 806. For example, the importer 804 may retrieve selected pieces of information regarding individual movies, such as the title, rating, release year, genre, etc. of each movie. The movie document database editor 808, which may comprise a suitably configured software program such as Microsoft Access, is provided to allow a maintainer of the database 806 to add, modify or delete data in the movies database 806. For example, the database editor 808 might be used to remove from the movies database 806 all movies made in a language other than English. The converter 810 converts the movie content stored in the movies database 806 into a document format that is more readily used by a browser 814. The browser 814 preferably comprises executable instructions that may be executed by a suitable processor (as described above) in conjunction with a display device to implement the graphical user interface. The techniques described above relative to FIGS. 5–7 may be equally employed in the second embodiment of the present invention when implementing the graphical user interface.

Figure 9:
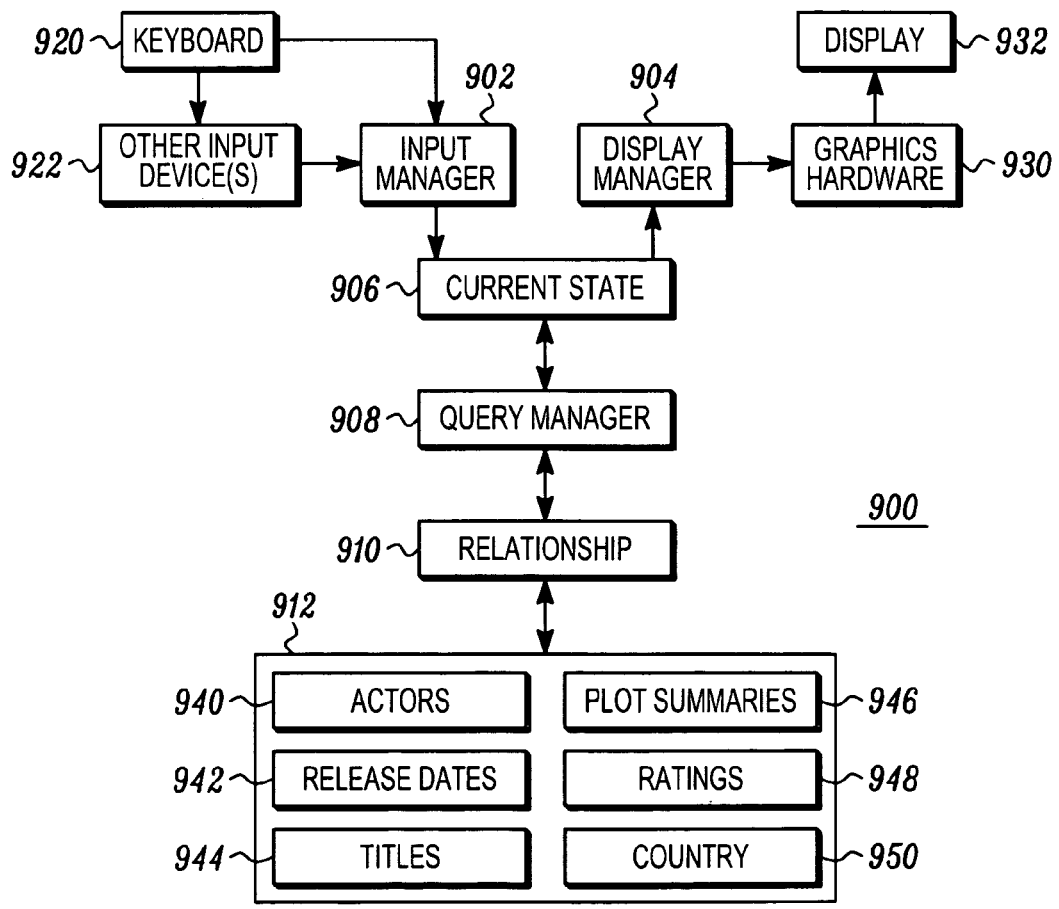
FIG. 9 is a schematic illustration of an architecture of a user device in accordance with the particular embodiment of the present invention illustrated in FIG. 8.

An exemplary architecture of a user device 900 in accordance with the second embodiment of the present invention is further illustrated in FIG. 9. Portions of the device 900 may be implemented as executable software instructions and/or hardware elements as a matter of design choice. In particular, an input manager 902, display manager 904, current state module 906, query manager 908, relationships module 910 and movie content 940–950 are preferably implemented as executable software instructions and/or data structures. In contrast, a storage device 912, keyboard 920, other input device(s) 922, graphics hardware 930 and display 932 are preferably implemented as hardware devices of the type well known in the art.

The input manager 902 alters the current state of the browser to reflect events received from the keyboard 920 or the other input device(s) 922. In a presently preferred embodiment, the other input device(s) 922 comprise any user-activated input device having independent input mechanisms, such as a video game controller Of course, it is understood that other types of input mechanisms (such as those described above relative to FIG. 1) may be equally employed. As the input manager 902 receives input data from the user of the device 900, it updates the current state module 906 accordingly. The current state module 906 embodies the current state of the graphical user interface on the display including the status of the matrix and corresponding icons, any currently selected icon as well as the display of any current search request. The current state module 906 provides input to the display manager 904 that, in turn, alters the appearance of the display when necessary to reflect the current state of the graphical user interface. The display manager 904 preferably alters images presented in the display 932 via separate processing capabilities provided by the graphics hardware 930. In a presently preferred embodiment, the graphics hardware 930 comprises a graphics accelerator platform capable of various effects described below (varying translucence, magnification, etc.) such as the "GEFORCE" series of graphics accelerators manufactured by Nvidia.

As further illustrated in FIG. 9, the current state module 906 additionally communicates with the query manager 908 when, based on input received from the input manager 902, the current state module 906 determines that the current state needs to be updated. In particular, current state module 906 issues queries to the query manager regarding movie content 940–950 in the storage device 912. For example, when a user selects, via an input device, a particular icon represented in the matrix, input data regarding the selection is received by the input manager 902 and passed on to the current state module 906. In turn, the current state module 906 issues a query to the query manager 908 requesting information about the selected movie (i.e., the element in the database corresponding to the selected icon). The query manager 908 consults the relationships module 910 when responding to the queries received from the current state module 906. The relationships module 910 embodies the relationships among the various database elements, i.e., the movie documents. In this embodiment, the relationships embodied in relationships module 910 are derived exclusively from network movie database 802. "Consult" in this context means something similar to what it means in the real world. If one needs to know something, a reference work can be "consulted" to acquire the sought-after information. Query manager 908 uses the current state 906 of the system to formulate a query, then uses that query to consult the relationships module 910 to construct a set of results that satisfies that query. For example, the relationships module 910 reflects the fact that a movie has many actors, each of whom has appeared in many movies, etc. Note that satisfying a single query may require multiple consultations with relationships module 910. Operating together, the query manager 908 and relationships module 910 operate as an interface to the storage device 912 and the movie content 940–950 stored therein.

As noted above, the example illustrated in FIG. 9 is directed to an embodiment of the present invention specific to a database of movie information. This is reflected by the particular movie content 940–950 shown in FIG. 9. In the presently preferred embodiment, the movie content comprises actor records 940, release data records 942, title records 944, plot summary records 946, rating records 948 and country of origin records 950 indexed according to each movie in the database. The data structures described above relative to the first embodiment may be equally employed in this second embodiment of the present invention. Thus, for example, the second embodiment also includes data structures used to maintain the row and column labels for the matrix within the graphical user interface. In particular, the row and column labels may reflect an attribute common to all of the movies represented in the database. For example, in the illustrations of FIGS. 10–13, a genre attribute used for the row labels, in this case comprising values of "Western", "War", "Thriller", "Short", "Sci-Fi", "Romance", "Mystery", "Musical", "Horror", "Film Noir", "Fantasy", "Family", "Drama", "Documentary", "Crime", "Comedy", "Animation", "Action" and "Adventure." Similarly, a release date attribute is used for the column labels, in this case comprising values from "1935+" through "1990+" corresponding to the years from 1935 through 1994 in groups of five.

Figure 10:
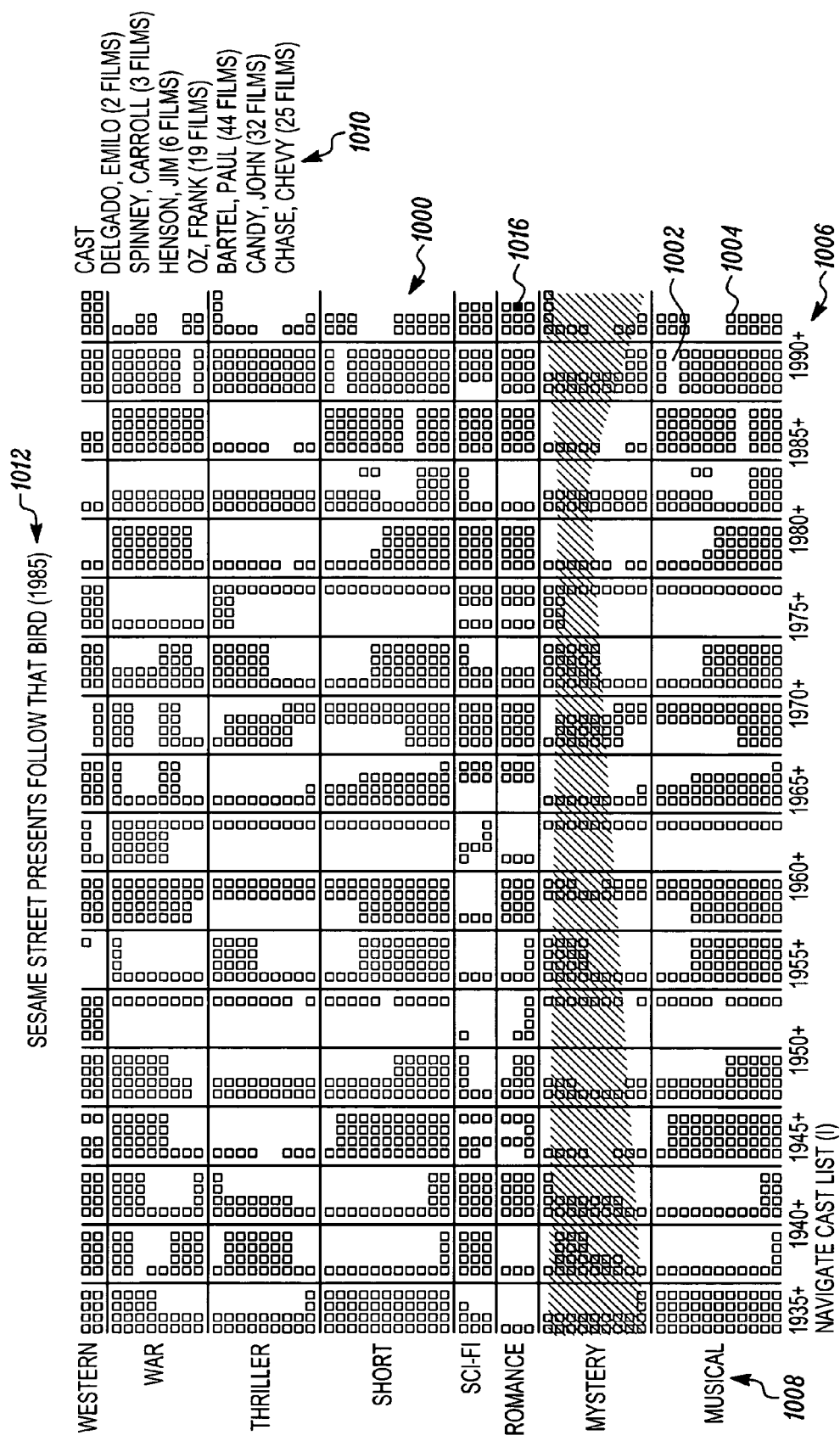
FIGS. 10–13 show various states of a graphical user interface in accordance with the embodiment of the present invention illustrated in FIGS. 8 and 9.

Various examples of a graphical user interface in accordance with the second embodiment of the present invention are further illustrated with reference to FIGS. 10–13. Referring now to FIG. 10, a matrix 1000 comprising a plurality of cells 1002, each cell comprising zero or more icons 1004, is illustrated. As described above, each row of cells has a row label or heading 1008 associated therewith, and each column of cells likewise has a column label or heading 1008 associated therewith. The particular forms of the matrix 1000, cells 1002 and icons 1004 are a matter of design choice and the present invention is not limited in this regard. Nevertheless, in a presently preferred embodiment, the matrix 1000 comprises a rectangular array of rectangular cells 1002. Likewise, each icon 1004 preferably comprises a rectangular block of only a relatively small number of pixels in an x and y dimension, depending on the display mode being used at any given point in time. Preferably, the dimensions of each icon are sufficiently small, and the dimensions of the indicia used to represent the matrix and its constituent cells are likewise sufficiently small, such that a large number of icons (on the order of tens of thousands) may be displayed at a single time.

Because a large number of icons can be displayed in this manner, it is possible to thereby gain an understanding of the overall context of the elements (e.g., the movies) in the database relative to the attributes used to categorize the cells in the matrix. For example, simple visual inspection of the relative numbers of icons within each cell indicates that the "Film Noir" genre experienced its most significant period during the mid to late 1940's, and has all but been abandoned in the modern era. As a further example, the "Comedy" genre experienced a significant lull during the late 1960's through the 1970's and has seen a steady resurgence (although still not at the volumes of the 1930's and 1940's) since the early 1980's. While these are in and of themselves relatively simple illustrations of the information contained in movies database 806, they also constitute a representative and easily-apprehended characterization of all of the movie data in movies database 806. As such, they serve as an excellent "backdrop" or context on which to show the results of various kinds of queries.

As users navigate through the matrix (using an input device of the types described above), they may choose to select one or more individual icons 1016. In a presently preferred embodiment, each icon may have one or more visually perceptible characteristics that may be altered to indicate selection or to illustrate a particular attribute of the element associated with a given icon, or both. For example, in a presently preferred embodiment, a color associated with each icon serves to indicate the country of origin attribute of the associated movie. Thus, for example, red icons indicate movies originated in the United States, whereas blue icons indicate movies originated in the United Kingdom. Furthermore, a relative size or other visual attribute of given icon may be used to indicate if the icon is currently selected by a user. Further still, the relative size or other visual attribute of each icon may be varied to direct the user's attention to particular icons, as for example those that match the current query. For example, in FIG. 10, the entire matrix 1000, with the exception of the at least one icon 1016, is shown using its default or typical colors. The at least one icon 1016, however, is shown as a slightly larger, black, blinking square. It is further emphasized by a translucent "cross-hair" comprising four triangles whose points converge on it. The use of translucence—varying opacity—to emphasize parts of a display without obscuring other parts is well known in the art of so-called "heads-up" displays.

In a presently preferred embodiment, each icon is displayed without any textual identifying indicia. However, as individual icons are selected within the matrix 1000, resulting in selection signals to the browser, data or information 1010, 1012 regarding the database element (movie) corresponding to the currently selected icon may be displayed in addition to the matrix 1000. For example, information regarding the cast 1010 of a given movie may be displayed along with the title 1012 of the movie.

Figure 11:
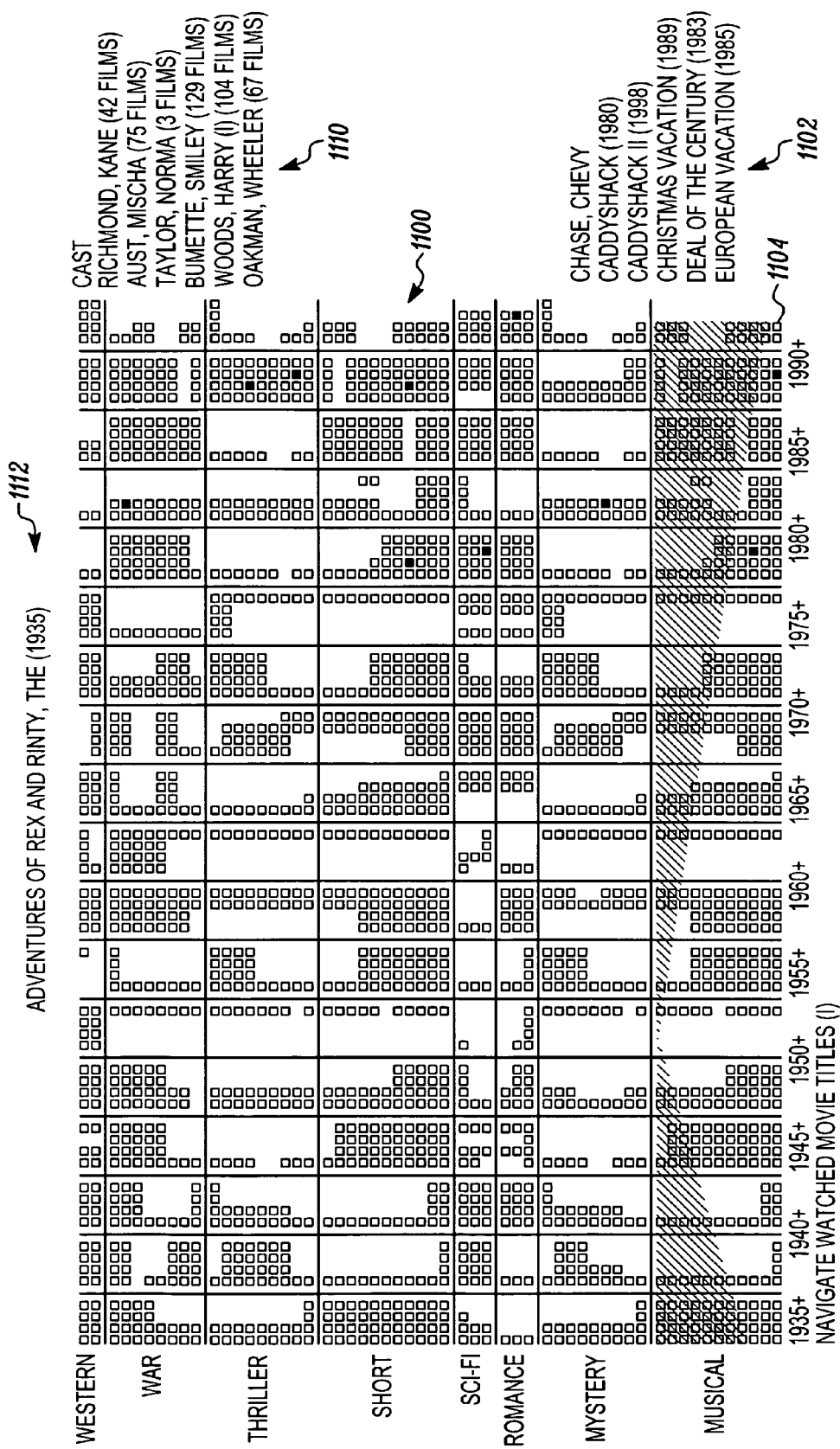

Referring now to FIG. 11, an example of the graphical user interface in which various search results have been highlighted is shown. In particular, a matrix 1 100 is displayed to maintain the user's context. However, it is assumed that the user previously entered a search query, in this case regarding all movies having the actor "Chevy Chase" in the cast. A listing 1102 of the returned search results (indexed, in this example, alphabetically by movie titles) may be provided. Additionally, individual icons 1104 corresponding to the movies indicated in the search results are highlighted so as at be visually, i.e., perceptively, distinct from the remainder of the matrix 1100. To this end, each of the highlighted icons 1104, in the example shown, "pulses"—that is, changes in size and/or shape, similar to being animated so as to visibly expand and contract. Those having ordinary skill in the art will recognize that other techniques (including, but not limited to, changes in color or through the use of animation, which should be construed to include changing any one or more of the size, shape, color or position of an icon under software control) may be used to highlight individual icons for this purpose. Note that an icon corresponding to a database element other than the returned search results may still be selected by the user as reflected by the cast 1110 and title 1112 information displayed that is otherwise unrelated to the search results.

So-called "heads-up" displays are known. Such devices are used on military aircraft to project an image onto a transparent surface, such as the airplane's windshield, whereby text and/or graphics can be made to appear on the interior surface of the windshield while allowing the pilot to peer through the windshield to the space in front of the airplane.

Figure 12:
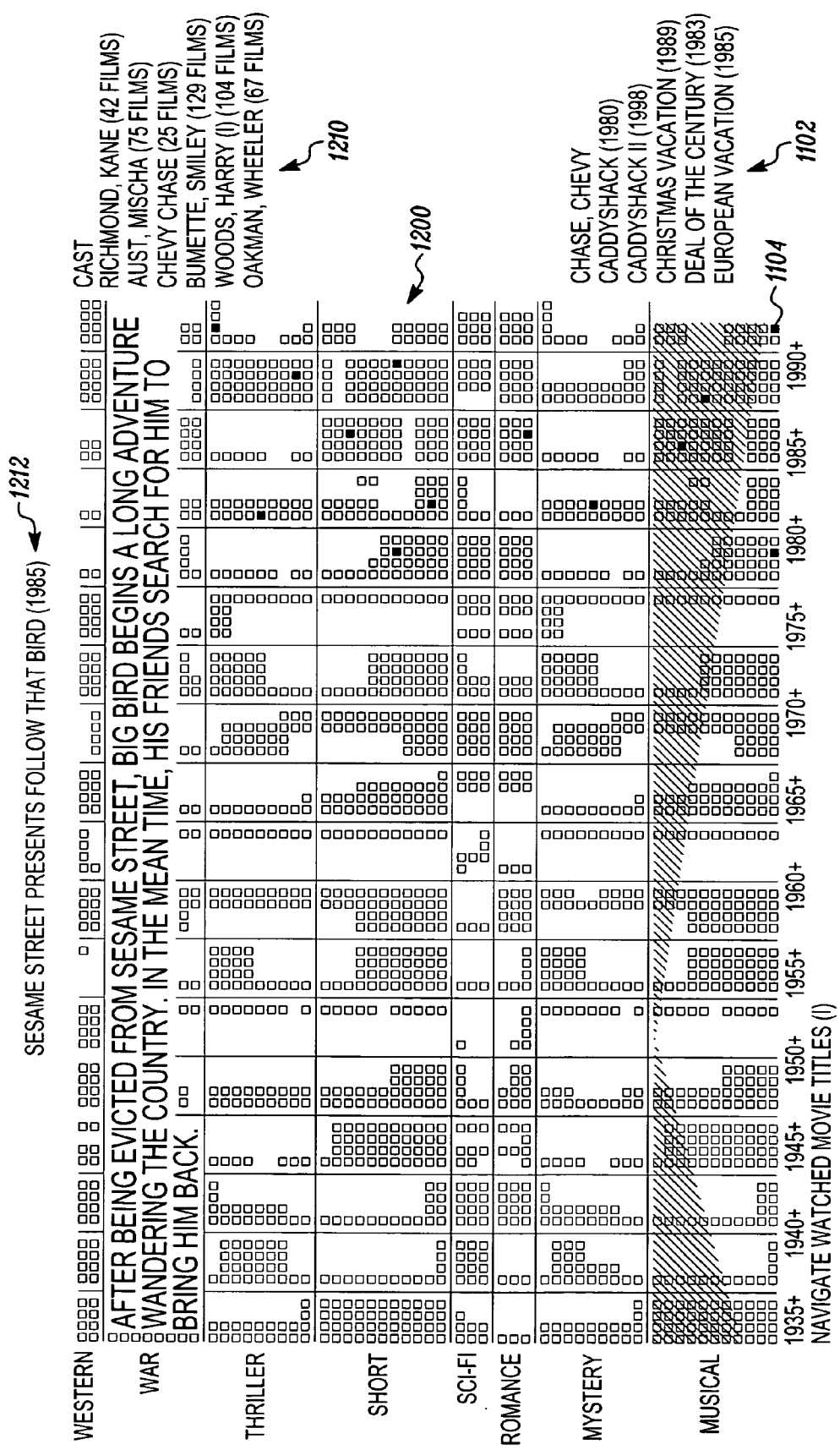

A further example of highlighting is illustrated in FIG. 12 where even greater use of so-called "heads-up" display capability of the present invention is employed. As in FIG. 11, a textual listing 1102 of the search results is provided along with highlighted icons 1104 corresponding to the search results. However, in this example, the matrix 1200 is "dimmed" to a low level of color saturation while translucent text (in this case, the selected movie's plot summary) is superimposed without entirely obscuring the icons beneath. This is a further example of providing detailed data while preserving the user's context.

Figure 13:
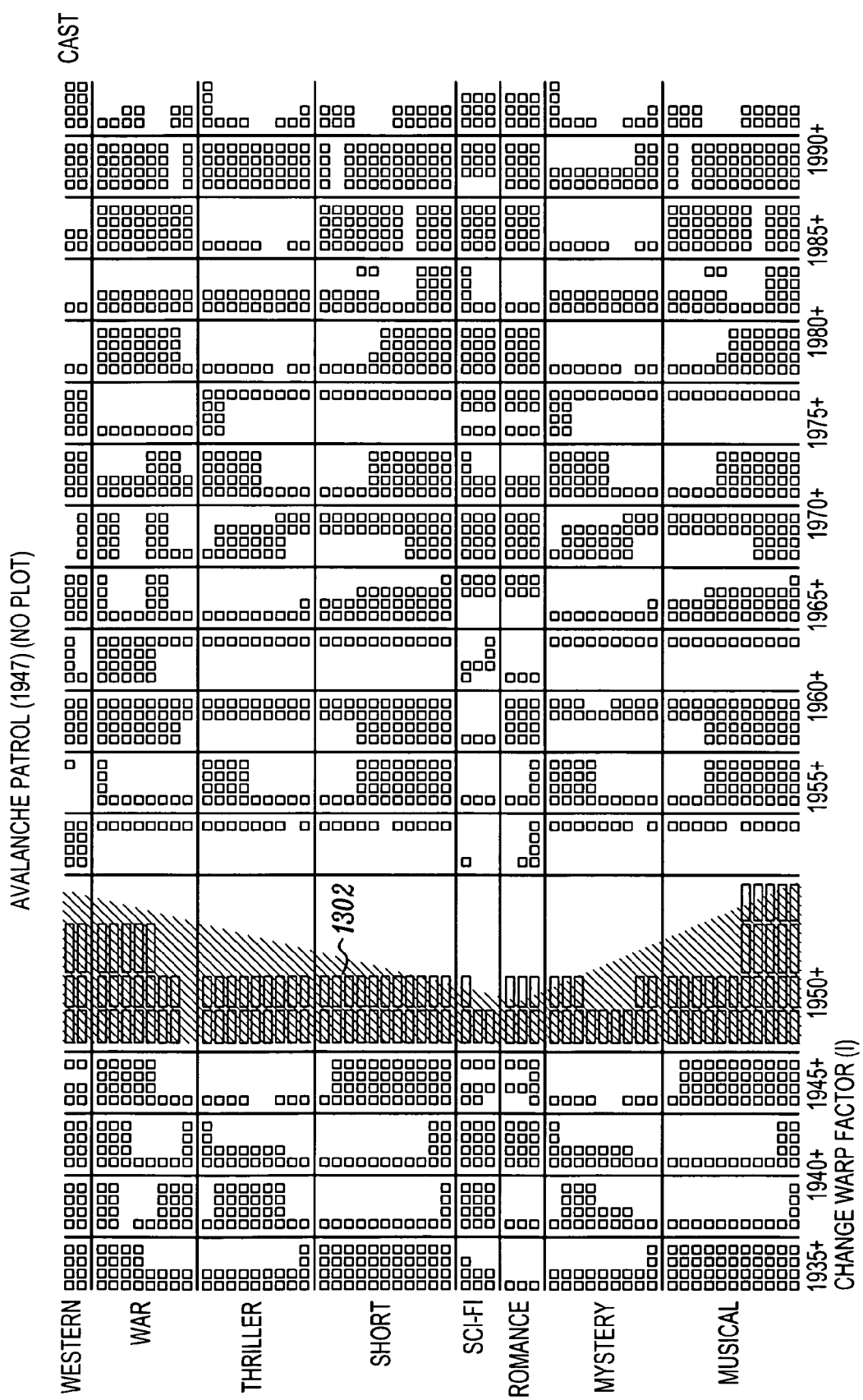

Yet another technique for focusing attention on a certain portion of the matrix while retaining the overall context of the displayed elements is illustrated in FIG. 13. In this example, various elements of the graphical user interface are "warped" such that a selected portion of the matrix appears magnified. In particular, a selected cell 1302 is magnified as well as the icons inside it. Simultaneously, all of the other cells in the matrix have been warped (either vertically or horizontally) to make room for it. Despite this, the warped cells preserve their icons, thereby letting the system simultaneously provide both detail (i.e., the icons in the magnified cell) and context (i.e., all of the other icons in the matrix) of the database. As such, a type of intra matrix warping is employed. Note that the other techniques described above for focusing attention to individual icons, such as changes in opacity or size, may be employed in addition to the magnification technique shown in FIG. 13.

Figure 14:
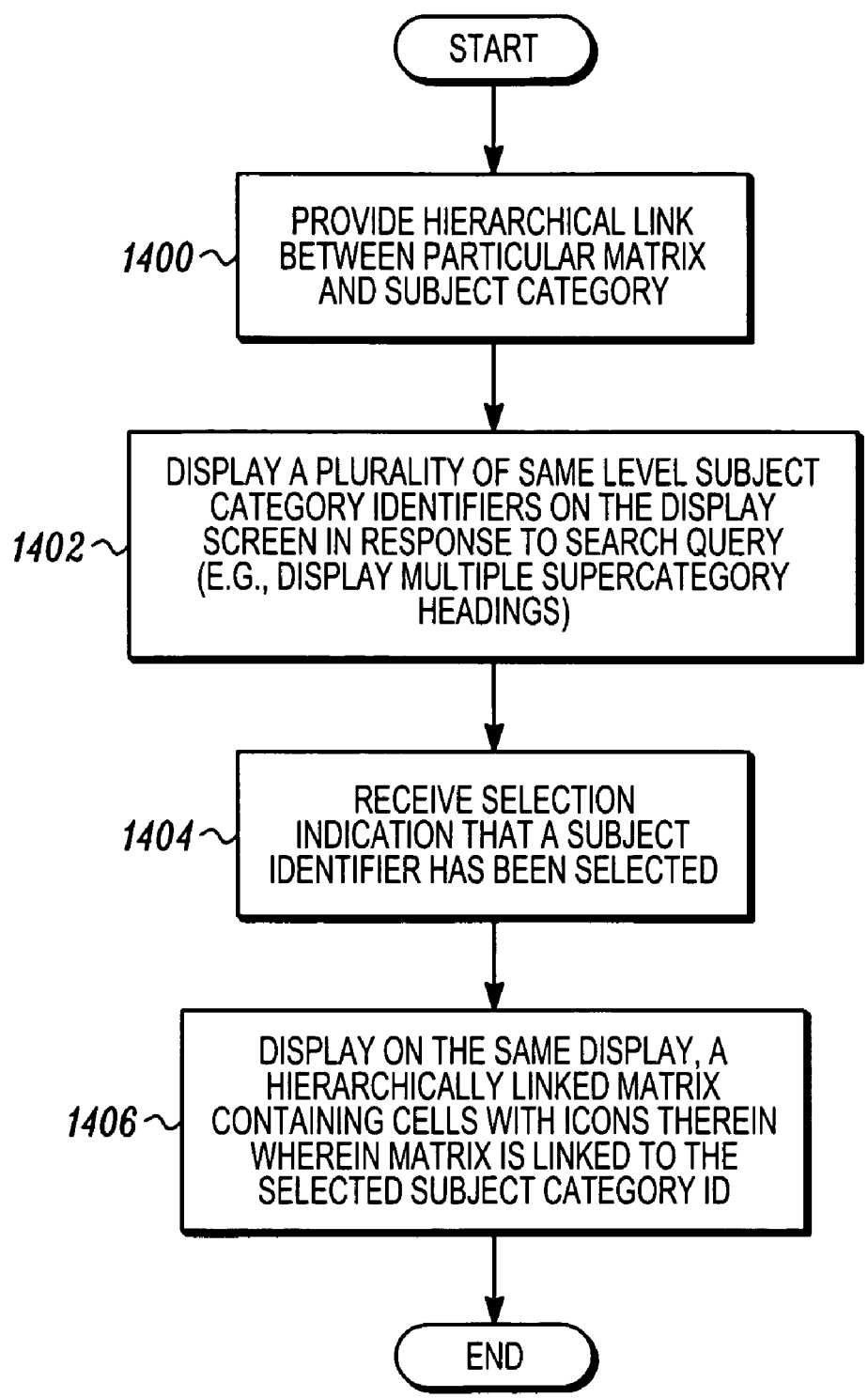
FIG. 14 is a flowchart illustrating one example of a method for displaying elements in a database in accordance with one embodiment of the invention.
Figure 15:
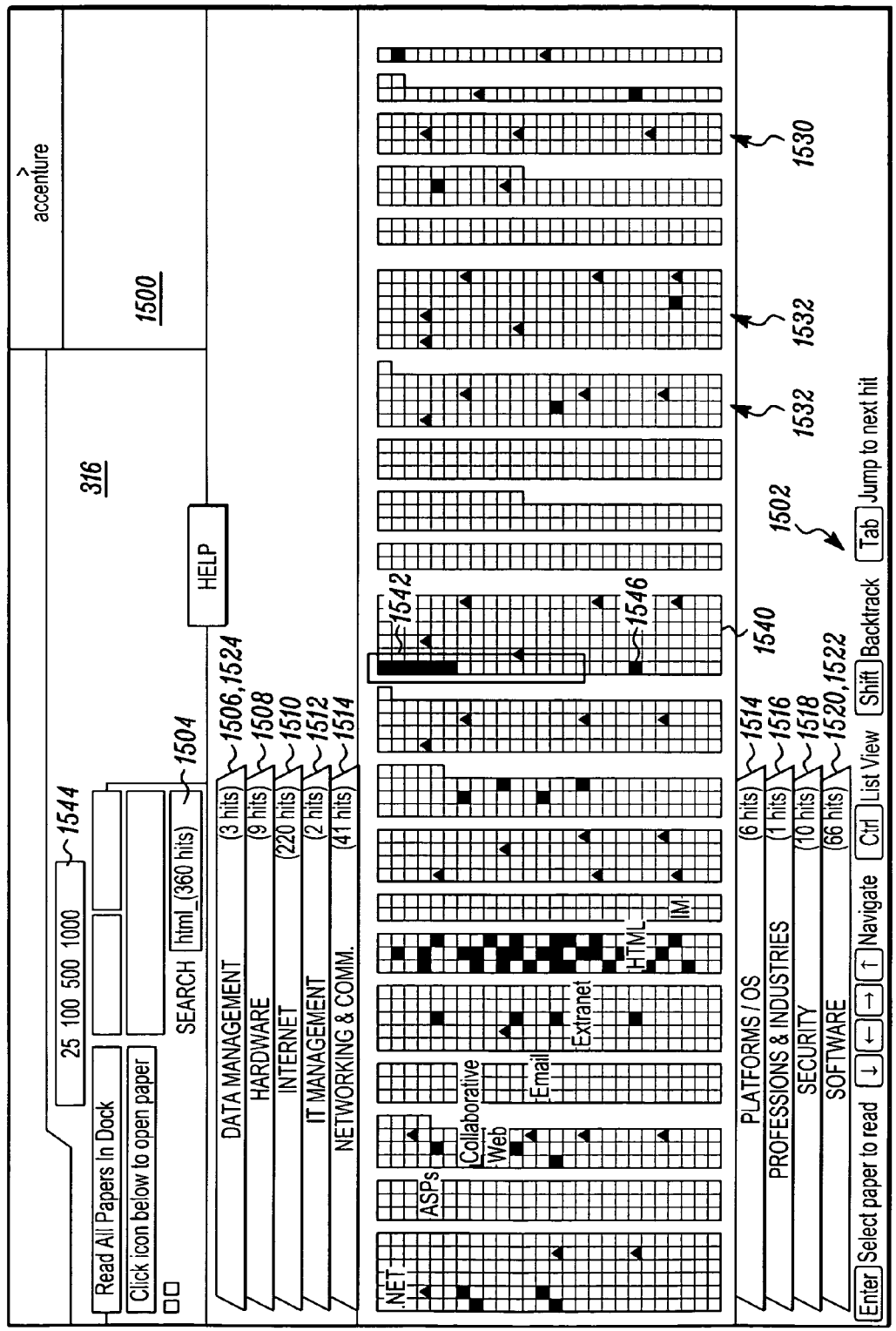
FIG. 15 shows a graphical user interface that can be used to retrieve and access information stored in the database in accordance with one embodiment of the invention.

Referring to FIGS. 14 and 15, another example of a method for displaying elements in database in accordance with another embodiment of the invention is shown. As with the other methods described herein, it will be recognized that although the steps are described in a particular order, that any suitable order of steps may also be employed and that any suitable structure may implement the requisite steps. The apparatus described above with respect to FIGS. 1–14 may be used to carry out the operations described below. In this embodiment, a hierarchical link between a matrix and a super category or subject category is used in connection with the display of a plurality of same level subject category identifiers on a display screen to facilitate the displaying of elements in a database. As shown in step 1400, the method includes providing a hierarchical link between a particular matrix and a particular subject category. For example, through an administrator user interface, the service provider may link various matrices with specific categories as desired. The categories may be represented by subject category identifiers on a display screen. In this example, a database link is made between a subject category entitled "internet" and a category entitled "eCommerce/e-business".

For example, as shown in FIG. 15, a graphic user interface 1500 includes a plurality of navigation buttons 1502 and other option buttons to facilitate an improved user experience when performing searches, such as searches on the internet, intranet or any other suitable database searching. As shown, a search field 1504 allows a user to enter keyword searches if desired. The user interface 1500 may serve as a front end application to another search application and database if desired. In this example, the user interface 1500 serves as a front end to a database search program that searches papers on various subjects that are stored in one or more databases. In this example, a plurality of same level subject category identifiers 1506–1522 are graphically illustrated in the form of text and graphics. In this example, nine different same level subject category identifiers are shown. In addition, the subject category identifiers 1506–1522 also include data 1524 that represents a number of database elements associated with the corresponding subject category that satisfied a search. In this example, the subject category "internet" includes two hundred and twenty hits and a total of eleven thousand two hundred and fifty two papers. To assist in explaining the user interface 1500, the same level subject category identifiers 1506–1522 will be considered super categories of data elements and are considered same level in that they are all at the same level of a hierarchy. As such, the same level subject category identifiers represent a super subject category, whereas the matrix represents a hierarchical category within the super subject category, and each cell in the matrix represents a subcategory of data elements within the hierarchical category and each icon in each cell represents a database element that is associated with the subcategory. If a user for example wishes to evaluate the hits found in the super category "internet" the user clicks on the subject category ID to notify the computer 100 to display the matrix 1530 which includes the plurality of cells 1532 wherein each of the cells includes in this example a plurality of icons in the form of squares as noted above with reference to FIGS. 1–13. In addition, each of the icons may be highlighted in a certain manner or visually distinguished over other icons in a particular square through colors, shape or any other suitable visual differentiation technique.

Referring back to FIG. 14, as shown in block 1402 the method includes displaying the plurality of same level subject category identifiers 1506–1522 on the display screen in response to a search query such as through the entry and acceptance of the search terms in the search field 1504. These multiple super category headings are then displayed and may be selected by a user. For example, as shown in block 1404, when a user activates the button, a GUI button in this case, associated with a given subject category ID 1506–1522 the computer 100 receives this selection indication that a subject identifier has been selected. As shown in block 1406, the method includes displaying on the same display area that includes the display of the subject category identifier, in a matrix area on the display, a hierarchically linked matrix 1530 that is linked (through any suitable database linking mechanism) to the selected subject category identifier. The matrix 1530 includes the plurality of cells 1532 and one or more icons displayed in each of the plurality of cells. The icons correspond to elements in the database and in this example include no textual identifying indicia. Also in this example, each cell 1532 corresponds to a different subcategory within the category "eCommerce/e-business" which is a category within the super category "internet". As also shown in this figure, the computer also simultaneously displays with the matrix 1530, other non-selected subject category identifiers such as 1506, 1508, 1512–1522. In this way, a user may bounce back and forth between same level super categories as desired. This may all be accomplished through the same user interface screen. Also as noted above, with the previous embodiments, the method also visually differentiates icons while retaining the context of the plurality of elements based on user action.

The user interface 1500 also illustrates another aspect that enhances searching and displaying of data elements. As shown, the matrix 1530 includes cells each of which include a number of icons that correspond to the number of data elements associated with a given subcategory or cell. In this example, the subcategories include documents corresponding to subjects such as email, portals, proxy servers, web browsers, and other categories. In each of the cells starting in the upper left corner of each cell are a grouping of sorted icons in, for example, a same column that are visually coded to visually represent a measure of popularity associated with each data element identified by the icons. For example, in the cell 1540 entitled "portals", icons designated as 1542 are represented starting with a bright red and gradually change color to lighter red, dark purple, lighter purple, dark blue, lighter blue, etc. in a gradient fashion corresponding to a popularity legend 1544 indicating which, in this case, documents have been accessed the most by other users. A different visual coding is used to designate those data elements that satisfied the search. In this example, icon 1546 is yet a different color such as orange and represents a hit. As shown, only one document from the "portals" category met the search criteria. In contrast, many documents are shown from the entire group of documents available in the "HTML" cell which satisfy the search criteria.

As such, as noted above the user interface 1500 is based on receiving a search request via input through a user input device such as, if desired, a mouse, voice activated input or otherwise. The computer 100 then identifies at least one element in a database that satisfies the search request input, such as the data element associated with icon 1546. The method includes visually differentiating the icon in the matrix that corresponds to the database element that satisfy the search request. In this case it may also include, for example, blinking the icon. As such, all the hits in the matrix may be blinking at the same time.

As also shown in this embodiment, the computer is suitably programmed to also visually code an icon in a matrix to indicate a level of recency of the database element that corresponds to the visually coded icon. For example, the triangles shown in the matrix 1530 represent documents that were recently added to the database. As such, a user can visually identify immediately the more recently added documents which may also coincide with the most recently published documents.

Figure 16:
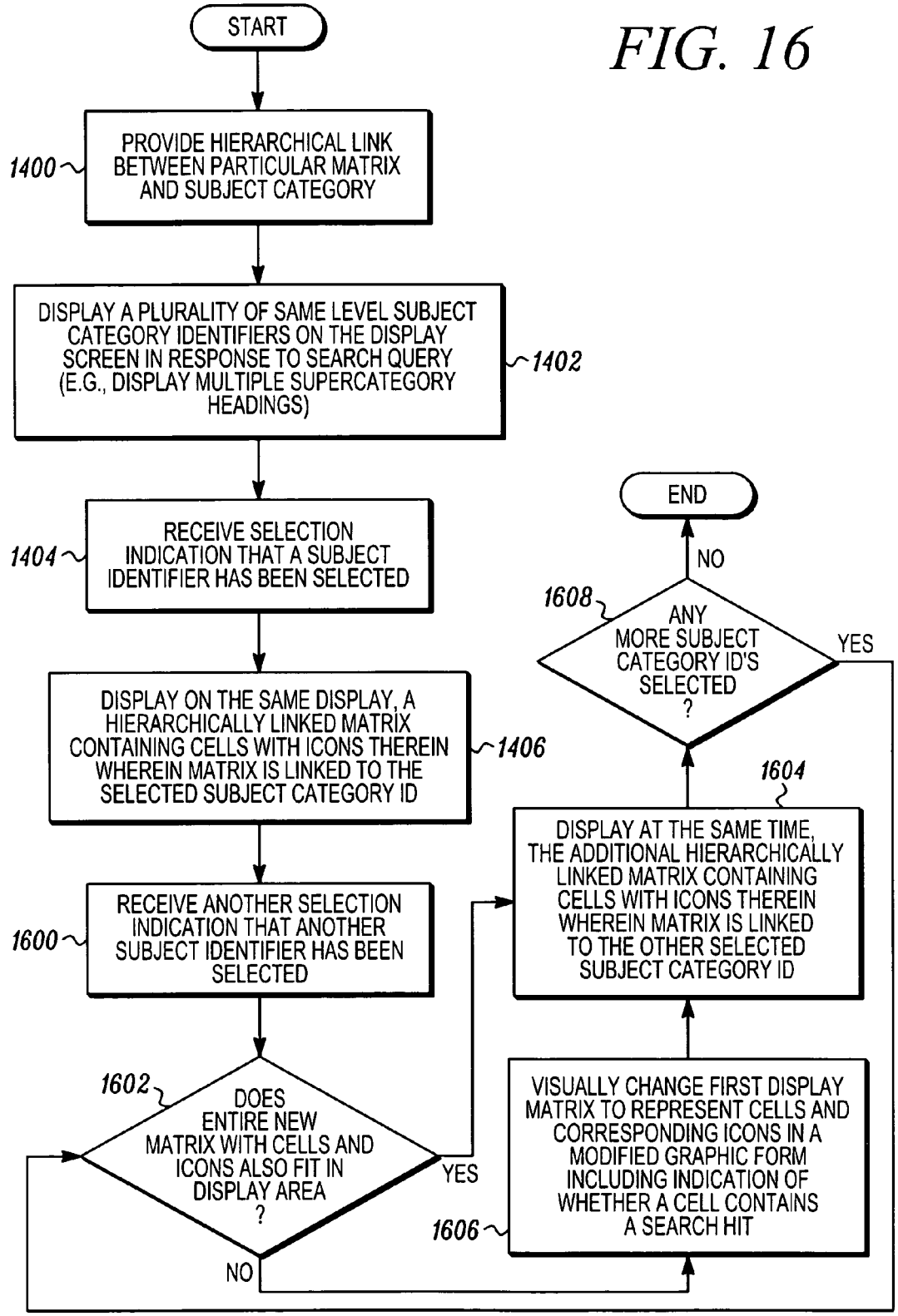
FIG. 16 is a flowchart illustrating one example of a method for displaying elements in a database in accordance with one embodiment of the invention.
Figure 17:
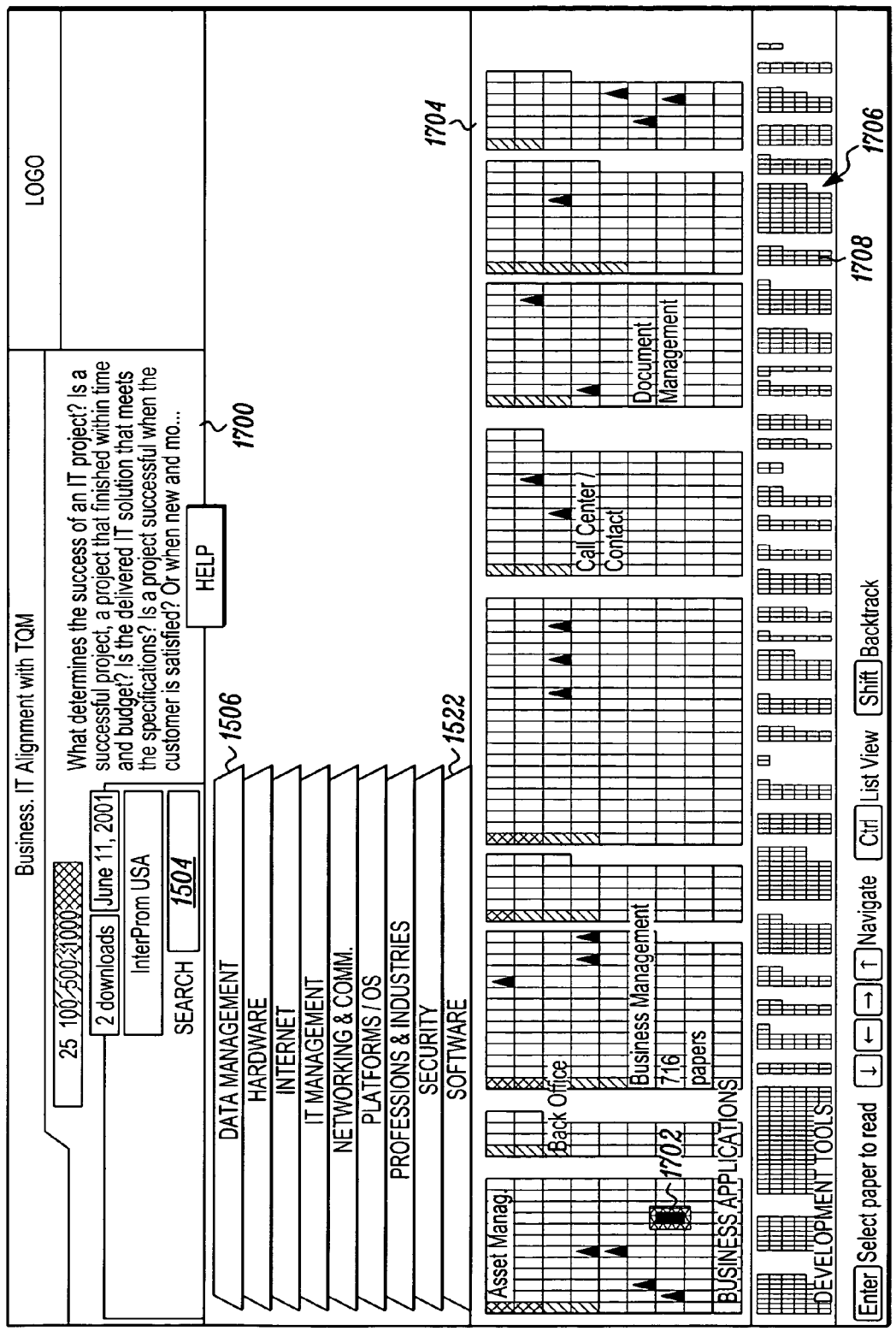
FIG. 17 shows a graphical user interface that can be used to retrieve and access information stored in a database in accordance with one embodiment of the invention.

Referring also to FIG. 17, a graphic user interface example is shown based on the method of FIG. 16. In order to accommodate very large databases with, for example, tens of thousands of documents, or more, FIGS. 16 and 17 illustrate an example where search results from a plurality of different same level super categories are shown to a user wherein one matrix associated with one super category is shown in detail whereas another matrix associated with a different super category is, in this example, modified and more specifically, shrunk while still providing pertinent information to the user. In this example, the text section of the user interface is filled with portions of an abstract, for example, as shown in 1700 selected from a document identified by the icon 1702 that has been activated. The same type of structure and icon differentiation as described with respect to FIG. 15 is employed. However, as shown in FIG. 16, the method includes as shown in block 1600, receiving another selection indication that another subject identifier has been selected. In this example, the two subject identifiers "software" and "development tools" have been selected. Accordingly, two matrices 1704 and a representation of another matrix 1706 are simultaneously presented in the user interface to the user. In this example the method includes, as shown in block 1602, determining whether the additional matrix and contents will fit into the display area in its entirety without being shrunk. If so, both matrices are displayed in their entirety as shown in block 1604. However as shown in block 1606, if the other matrix will not fit, then the method includes visually changing the first display matrix to represent cells and corresponding icons in a modified graphic form, such as in form illustrated by matrix 1706, including indication of whether a cell contains a search hit. In this example, the cells from the "development tools" matrix 1706 are shrunk and the icons are removed but for a indication in a given cell that at least one icon satisfies a search hit. In this example the representation is a small line shown as 1708.

As shown in block 1608, the method includes determining whether any more subject category IDs have been selected. If so, the process repeats and, in effect hides portions of a matrix but still makes portions of it visible so that the user gains information about other subcategories that may have relevant information to a given search. As such, a type of inter matrix warping occurs to shrink or enlarge a given matrix to accommodate a desired display area. The matrix 1706 also illustrates intra matrix warping in that the icons are larger in this example than those shown in FIG. 16 because there are fewer cells and more papers or data elements. As such, the processor or the computer 100 automatically adjusts the size of the matrices to fill in the available display area.

Figure 18:
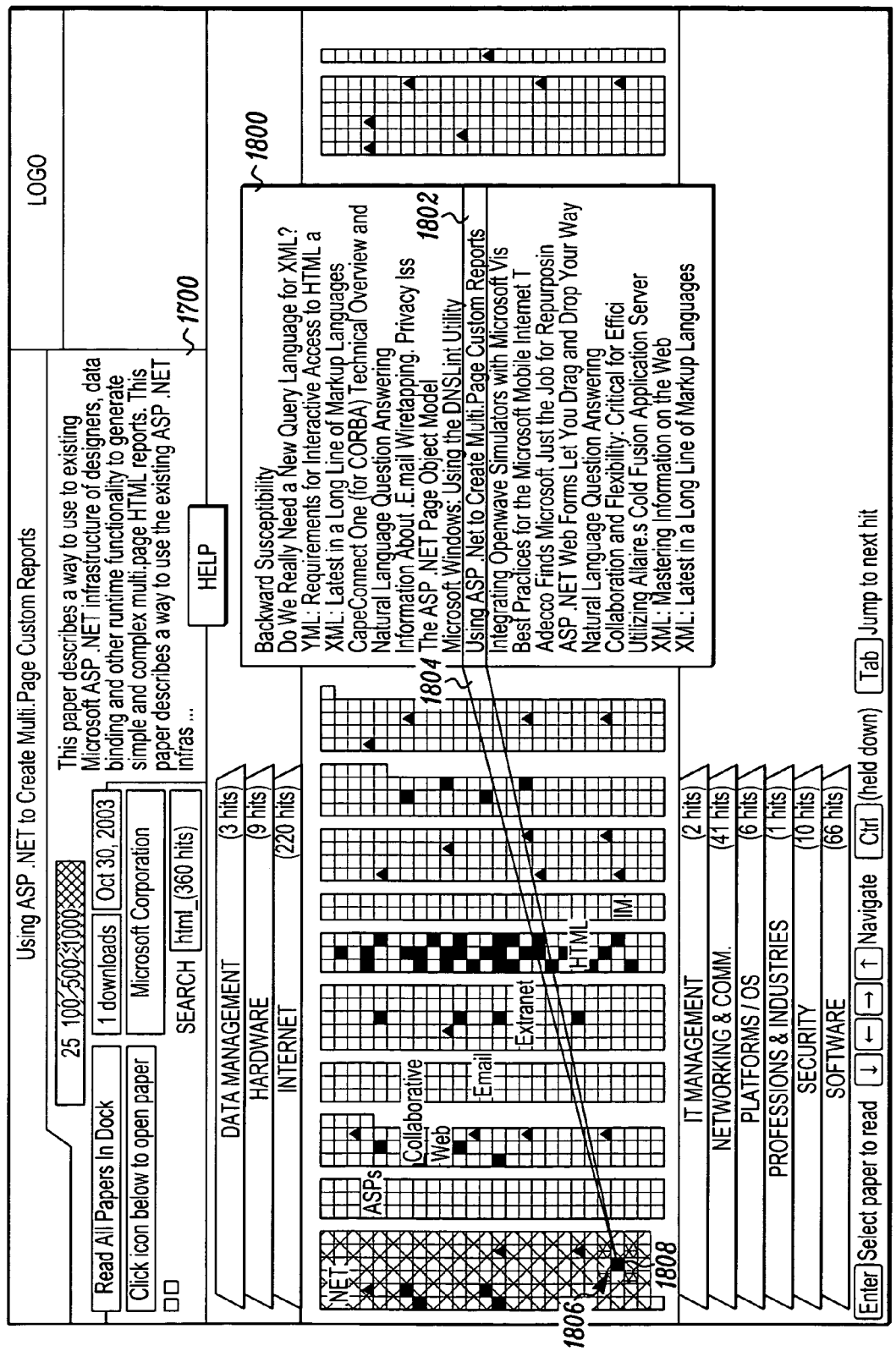
FIG. 18 shows a graphical user interface that can be used to retrieve and access information stored in a database in accordance with one embodiment of the invention.

FIG. 18 illustrates another embodiment which employs a superimposed menu or list 1800 that is superimposed over a portion of a matrix in such a manner as to avoid obscuring the underlying matrix data. In this example, a translucent list of database elements 1800 is overlayed on top of the matrix. The list of database elements may be for example an alphabetical text list or entire list of all of the elements in a given cell. In this example, a user can readily navigate from the list to the corresponding icon to determine whether or not a particular data element has a hit or if it was a recent edition for example. In this example, in response to a user selecting an item on the list, such as item 1802, the computer generates a visual connector 1804, in this example in the form of a search light that connects the border of the list 1802 and points to an icon locating element 1806, here in the form of a type of bulls eye, that visually identifies the icon 1808 and the matrix corresponding to the selected entry on the list 1802. As such a user can navigate to a given icon from a text list. The text list may be pulled up by clicking on the cell, in this case the cell entitled ".net". Other suitable variations will be recognized by those of ordinary skill in the art.

The above method and apparatus may be implemented in any suitable manner as described above and in the case where the implementation is carried out in the form of executable instructions, the executable instructions are suitably stored in a storage medium that contains the instructions to allow one or more processors to carry out the operations described above.

Based on the above disclosure, the hierarchical linking allows the visual representation of more data elements than with conventional user interfaces and expands and contracts matrices to accommodate user preferences. The graphic representation of all the elements in a given category allow the user to readily note what percentage of available elements satisfied a hit, which elements are most popular in a given subcategory, how many hits were maintained, which elements are recently added, all in a graphical manner if desired. Any other suitable operations may also be readily added as recognized by one of ordinary skill in the art. The search light example effectively lights up a pointer from a text list to another portion of the screen pointing to the corresponding icon. The system dynamically adjusts the size of the graphics based on the number of elements found in a subcategory. In addition, all the icons may become smaller in different parts of a tree depending upon the per category or subcategory that the icons are associated with.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

The invention claimed is:

1. In a computer system comprising a display and at least one user input device, a method for displaying elements in a database, the method comprising:
   displaying a plurality of same level subject category identifiers on a display area; and
   in response to selection of at least a first of the plurality of subject category identifiers on the display,
   displaying on the same display area, in a matrix area on the display, a hierarchically linked matrix that is linked to first selected subject category identifier, a matrix having a plurality of cells and a plurality of icons displayed in the plurality of cells, each icon corresponding to an element in the database and comprising no textual identifying indicia, the plurality of icons being sufficient in number to establish a context for the user of the plurality of elements;
   superimposing a list of database elements associated with the subject category identifier, over at least a portion of the matrix to avoid obscuring the underlying matrix data; and,
   in response to a user selecting an item on the list, generating a visual connector from the list to a corresponding icon locating element that visually identifies the icon in the matrix corresponding to the selected entry on the list.

2. The method of claim 1 including:
   in response to selection of a second of the plurality of subject category identifiers on the display,
   displaying on the same display area, in another matrix area on the display, another hierarchically linked matrix that is linked to the second selected subject category, having a plurality of cells and at least one icon displayed in at least one of the cells, the at least one icon corresponding to an element in the database and comprising no textual identifying indicia; and
   visually changing the first displayed matrix to visually represent cells and corresponding icons of one of the plurality of displayed matrices in a modified graphic form while also displaying the second matrix.

3. In a computer system comprising a display and at least one user input device, a method for displaying elements in a database, the method comprising:
   displaying a plurality of same level subject category identifiers on a display area;
   in response to selection of at least a first of the plurality of subject category identifiers on the display,
   displaying on the same display area, in a matrix area on the display, a hierarchically linked matrix that is linked to first selected subject category identifier, having a plurality of cells and at least one icon displayed in each of the plurality of cells, the at least one icon corresponding to an element in the database and comprising no textual identifying indicia; and
   visually coding an icon in a matrix to indicate a level of recency of the database element corresponding to the icon.

4. An apparatus for displaying elements in a database, comprising:
   a display;
   at least one user input device;
   a processor coupled to the display and the at least one user input device;
   a storage device, coupled to the processor, having stored thereon executable instructions that, when executed by the processor, cause the processor to:
   display a plurality of same level subject category identifiers on a display area on the display;
   in response to selection of at least a first of the plurality of subject category identifiers on the display,
   display on the same display area, in a matrix area on the display, a-hierarchically linked matrix that is linked to first selected subject category identifier, having a plurality of cells and at least one icon displayed in each of the plurality of cells, the at least one icon corresponding to an element in the database and comprising no textual identifying indicia, the plurality of icons being sufficient in number to establish a context of the plurality of elements;

detect a user action via the at least one user input device;

display, in response to the user action, at least one icon of the plurality of icons visually differently from remaining ones of the plurality of icons while retaining the context of the plurality of elements; and further comprising executable instruction that, when executed by the processor, cause the processor to:

visually code an icon matrix to indicate a level of recency of the database element corresponding to the icon.

* * * * *